United States Patent
Sawatsubashi et al.

(10) Patent No.: US 9,540,577 B2
(45) Date of Patent: Jan. 10, 2017

(54) MERCURY REMOVAL SYSTEM, GASIFICATION SYSTEM, GASIFICATION COMBINED POWER GENERATION SYSTEM AND MERCURY REMOVAL METHOD

(71) Applicant: MITSUBISHI HITACHI POWER SYSTEMS, LTD., Kanagawa (JP)

(72) Inventors: Tetsuya Sawatsubashi, Tokyo (JP); Yoshinori Koyama, Tokyo (JP); Takashi Fujii, Tokyo (JP); Takashi Iwahashi, Tokyo (JP); Norihiro Oba, Tokyo (JP); Koji Nishimura, Tokyo (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 298 days.

(21) Appl. No.: 14/475,906

(22) Filed: Sep. 3, 2014

(65) Prior Publication Data

US 2015/0068189 A1    Mar. 12, 2015

(30) Foreign Application Priority Data

Sep. 11, 2013 (JP) ................. 2013-188680
Sep. 11, 2013 (JP) ................. 2013-188681

(51) Int. Cl.
*C10J 3/50* (2006.01)
*B01D 53/64* (2006.01)
(Continued)

(52) U.S. Cl.
CPC ................. *C10J 3/50* (2013.01); *B01D 53/64* (2013.01); *B01D 53/79* (2013.01); *B01D 53/83* (2013.01);
(Continued)

(58) Field of Classification Search
CPC .................. C10J 3/50; C10J 2300/0903; C10J 2300/0906; C10J 2300/0909; C10J 2300/093; C10J 2300/0983; C10J 2300/165; C10J 2300/1653; B01D 53/64; B01D 53/79; B01D 53/83; B01D 2257/602; B01D 2259/128; Y02E 20/18
See application file for complete search history.

(56) References Cited

FOREIGN PATENT DOCUMENTS

JP    9-53815    2/1997
JP    09053815 A  *  2/1997
(Continued)

OTHER PUBLICATIONS

Office Action issued Aug. 30, 2016 in corresponding Japanese Application No. 2013-188680, with English Translation.
(Continued)

*Primary Examiner* — Corey Skurdal
(74) *Attorney, Agent, or Firm* — Wenderoth, Lind & Ponack, L.L.P.

(57) ABSTRACT

Provided is a mercury removal system 1 provided in a powder supply system including a pulverizing machine 118 that pulverizes a hydrocarbon raw material, the mercury removal system including: a removal agent supply device 11 which supplies a mercury removal agent; and a mercury removal agent dust collector which collects the dust of the mercury removal agent, wherein a gas discharge line to which the dry flue gas is supplied is connected to the mercury removal agent dust collector, wherein the removal agent supply device includes a mercury removal agent supply line which supplies the mercury removal agent, and wherein the mercury removal agent supply line is connected to the upstream side of the mercury removal agent dust collector in the circulation direction of the dry flue gas.

28 Claims, 16 Drawing Sheets

(51) Int. Cl.
    *B01D 53/79*     (2006.01)
    *B01D 53/83*     (2006.01)

(52) U.S. Cl.
    CPC ... *B01D 2257/602* (2013.01); *B01D 2259/128* (2013.01); *C10J 2300/0903* (2013.01); *C10J 2300/093* (2013.01); *C10J 2300/0906* (2013.01); *C10J 2300/0909* (2013.01); *C10J 2300/0983* (2013.01); *C10J 2300/165* (2013.01); *C10J 2300/1653* (2013.01); *Y02E 20/18* (2013.01)

(56) References Cited

FOREIGN PATENT DOCUMENTS

| | | | | |
|---|---|---|---|---|
| JP | 2009-662 | | 1/2009 | |
| JP | 2009000662 A | * | 1/2009 | |
| JP | 2009-291734 | | 12/2009 | |
| JP | 2009291734 A | * | 12/2009 | |
| JP | 4424653 | | 3/2010 | |
| JP | 2011-12146 | | 1/2011 | |
| JP | 2012-180426 | | 9/2012 | |
| JP | 2012-206016 | | 10/2012 | |
| JP | 2012206016 A | * | 10/2012 | |
| JP | 2013-170463 | | 9/2013 | |
| JP | 2013170463 A | * | 9/2013 | |
| JP | 2015-55403 | | 3/2015 | |
| WO | WO 2014073268 A1 | * | 5/2014 | ......... B01D 53/8609 |
| WO | WO 2015136678 A1 | * | 9/2015 | ............... F23K 1/04 |

OTHER PUBLICATIONS

Japanese Decision of a Patent Grant issued Nov. 15, 2016 in corresponding Japanese Patent Application No. 2013-188680 with English translation.

\* cited by examiner

MERCURY REMOVAL SYSTEM, GASIFICATION SYSTEM, GASIFICATION COMBINED POWER GENERATION SYSTEM AND MERCURY REMOVAL METHOD

FIELD

The present invention relates to a mercury removal system provided in a powder supply system that pulverizes a hydrocarbon raw material such as coal and supplies a pulverized powder raw material and also relates to a gasification system, a gasification combined power generation system, and a mercury removal method.

BACKGROUND

Hitherto, a removal agent that removes gaseous mercury is known (for example, see Patent Literature 1). The removal agent is used to remove gaseous mercury contained in a gasified gas generated by gasifying coal or the like or to remove gaseous mercury contained in a flue gas generated by burning coal or the like.

CITATION LIST

Patent Literature

Patent Literature 1: Japanese Patent No. 4424653

SUMMARY

Technical Problem

Incidentally, in a case where a gasified gas is generated by gasifying coal, the coal is pulverized by a coal pulverizer so as to become pulverized coal. Then, the pulverized coal is subjected to a dust collection process by a pulverized coal dust collector, and the pulverized coal from which the dust is collected is supplied to a gasification furnace, so that a gasified gas is generated in the gasification furnace. Here, a dry gas for drying the coal (the pulverized coal) is supplied to the coal pulverizer. For this reason, the coal pulverizer discharges the pulverized coal and the dry gas in a mixed state. The pulverized coal and the dry gas are separated into the pulverized coal and the dry gas in the pulverized coal dust collector, and the separated dry gas is discharged as a dry flue gas from the pulverized coal dust collector. Incidentally, since the separated dry flue gas discharged from the pulverized coal dust collector contains the mercury in the coal in the gasified state, there is a demand for removing the gasified mercury from the dry flue gas in order to improve the environmental performance.

Solution to Problem

According to an aspect of the present invention, there is provided a mercury removal system provided in a powder supply system including a pulverizing machine that pulverizes a hydrocarbon raw material along with a dry gas supplied from the outside so as to become a powder raw material, the mercury removal system including: a removal agent supply device which supplies a mercury removal agent for removing mercury contained in a dry flue gas discharged from the pulverizing machine; and a mercury removal agent dust collector which collects the dust of the mercury removal agent so as to be separated into the mercury removal agent and a pure gas, wherein a gas discharge line to which the dry flue gas is supplied is connected to the mercury removal agent dust collector, wherein the removal agent supply device includes a mercury removal agent supply line which supplies the mercury removal agent, and wherein the mercury removal agent supply line is connected to the upstream side of the mercury removal agent dust collector in the circulation direction of the dry flue gas.

DESCRIPTION OF EMBODIMENTS

Hereinafter, embodiments below will be described with reference to the accompanying drawings. Furthermore, the invention is not limited to the embodiments below. Further, the components of the embodiments below include a component which may be easily replaced by a person skilled in the art or a component which has substantially the same configuration.

First Embodiment

Figure 1:
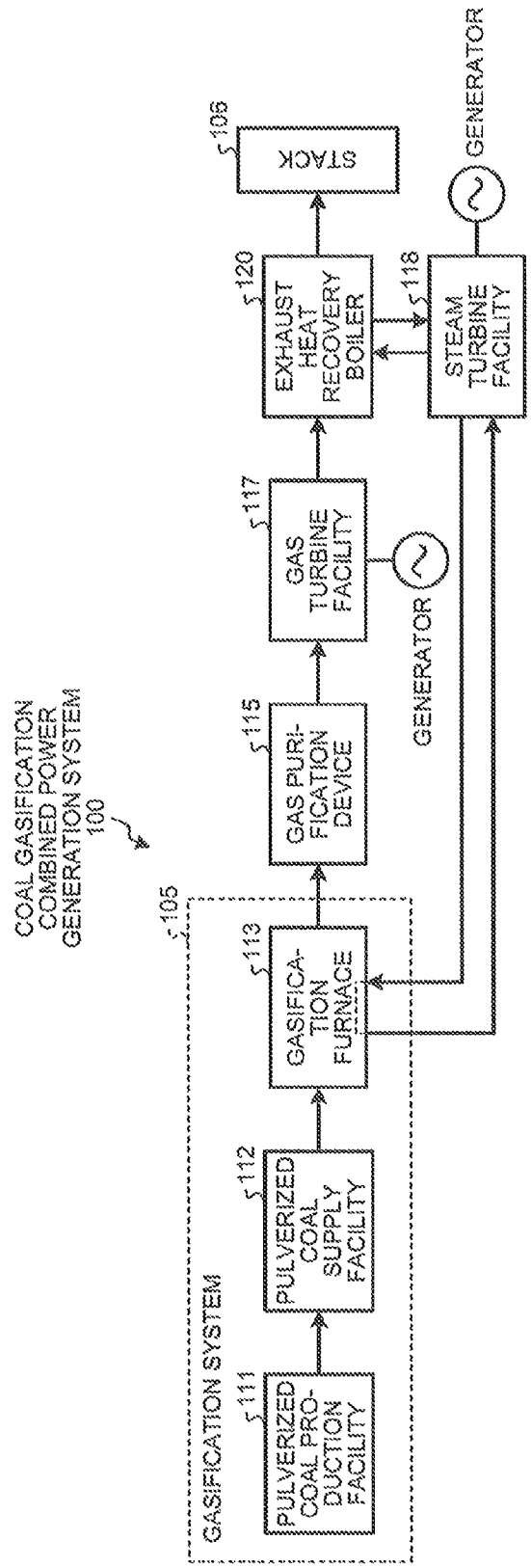
FIG. 1 is a schematic configuration diagram of a coal gasification combined power generation system that employs a mercury removal system according to a first embodiment.

FIG. 1 is a schematic configuration diagram of a coal gasification combined power generation system that employs a mercury removal system according to a first embodiment. A mercury removal system 1 of the first embodiment is applied to a coal gasification combined power generation system (IGCC: Integrated Coal Gasification Combined Cycle) 100 including a gasification system 105. Furthermore, in the first embodiment, the mercury removal system is applied to the coal gasification combined power generation system 100, but the invention is not limited to the coal gasification combined power generation system 100. For example, any facility including the gasification system 105 may be used.

The coal gasification combined power generation system 100 produces a coal gas (produced gas) in a gasification furnace and supplies a pure gas, from which impurities in the produced gas are purified by a gas purification device, as a fuel gas to a gas turbine facility so as to generate power. A pulverized coal which is obtained by pulverizing and drying a coal is supplied to the gasification furnace.

Furthermore, the coal is used in the first embodiment, but any material may be used as long as a material (a hydrocarbon raw material) containing hydrocarbon is used. That is, as the hydrocarbon raw material, for example, a coal such as a brown coal, a subbituminous coal, and a bituminous coal, a waste material such as sludge, petroleum residue such as cokes and VR (Vacuum Residue), or the like may be used. Further, biomass used as an organic resource produced from a regenerable nature substance may be used as the hydrocarbon raw material. For example, timber, waste wood, driftwood, a grass, waste, mud, a tire, and a recycled fuel (pellet or chip) obtained therefrom may be used.

In the example illustrated in FIG. 1, the coal gasification combined power generation system 100 includes a pulverized coal production facility (a powder supply system) 111, a pulverized coal supply facility 112, a gasification system 105 with a gasification furnace 113, a gas purification device 115, a gas turbine facility 117, a steam turbine facility 118, an exhaust heat recovery boiler (HRSG: Heat Recovery Steam Generator) 120, and a stack 106.

Figure 2:
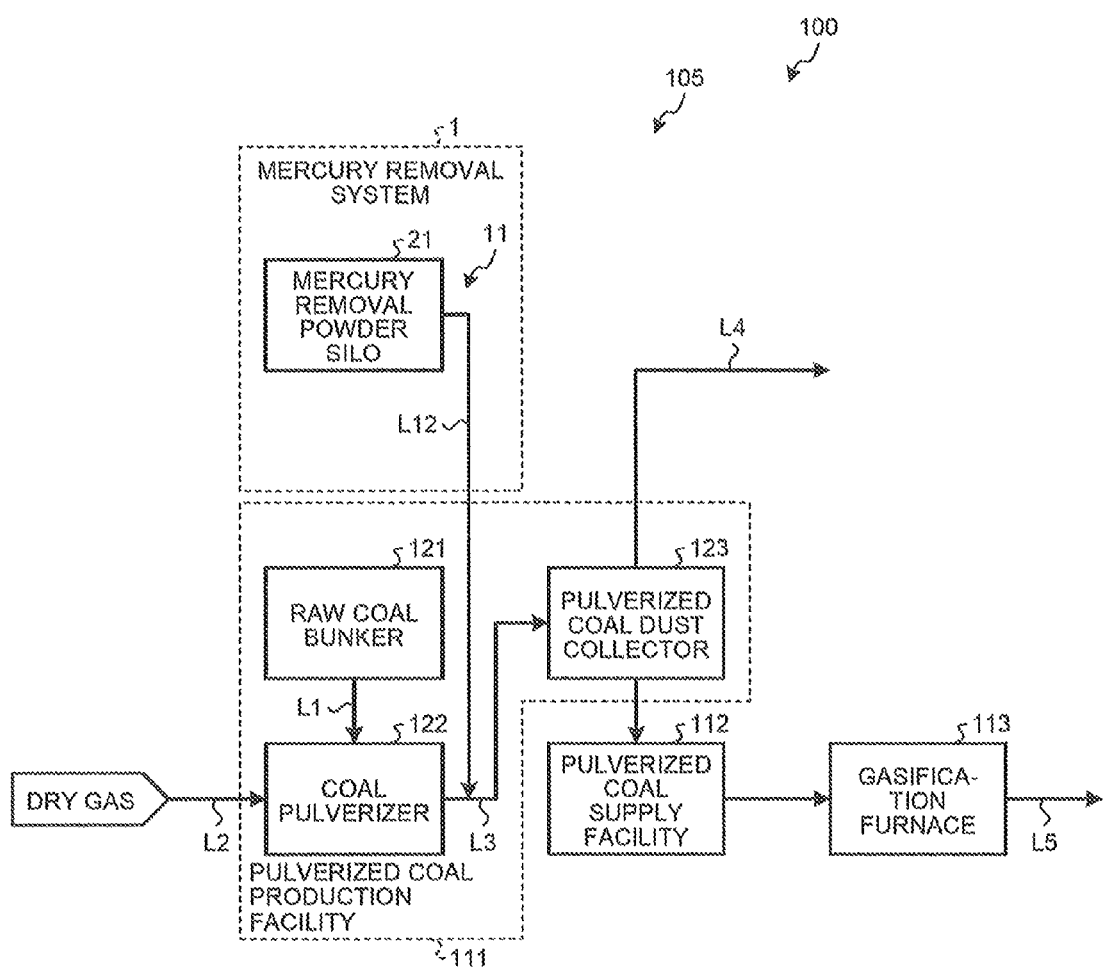
FIG. 2 is a schematic configuration diagram schematically illustrating the configuration of the mercury removal system according to the first embodiment.

As illustrated in FIG. 2, the pulverized coal production facility 111 includes a raw coal bunker (a raw material tank) 121, a coal pulverizer (a pulverizing machine) 122, and a pulverized coal dust collector (a powder dust collector) 123. The raw coal bunker 121 may store raw coal (coal) and supplies a predetermined amount of the raw coal to the coal pulverizer 122 through a raw coal supply line (a hydrocarbon raw material supply line) L1. The coal pulverizer 122 produces a pulverized coal by pulverizing the raw coal supplied thereto into fine particles and drying and reducing the moisture contained in the raw coal by a dry gas supplied from a dry gas supply line L2 connected to the coal pulverizer 122. Then, the coal pulverizer 122 supplies the pulverized coal to the pulverized coal dust collector 123 along with the dry gas through a pulverized coal supply line (a powder raw material supply line) L3. The pulverized coal dust collector 123 is formed as, for example, a bag filter, and is used to collect dust from the pulverized coal supplied thereto and to supply the pulverized coal from which the dust is collected to the pulverized coal supply facility 112. Further, the pulverized coal dust collector 123 discharges the dry gas separated by the collection of the dust from the pulverized coal from a gas discharge line L4 connected to the pulverized coal dust collector 123. Furthermore, a heat gas which is extracted from the exhaust heat recovery boiler 120 described below may be used as the dry gas supplied to the coal pulverizer 122.

For this reason, the pulverized coal production facility 111 produces a pulverized coal in which the raw coal is pulverized and dried as a predetermined particle diameter or less by the coal pulverizer 122 when the raw coal stored in the raw coal bunker 121 is supplied to the coal pulverizer 122 through the raw coal supply line L1. Then, the pulverized coal is supplied from the coal pulverizer 122 to the pulverized coal dust collector 123 through the pulverized coal supply line L3 along with the dry flue gas. Subsequently, dust is collected from the pulverized coal by the pulverized coal dust collector 123 so as to be separated into the pulverized coal and the dry flue gas. Here, the separated pulverized coal is supplied to the pulverized coal supply facility 112, and the separated dry flue gas is discharged from the gas discharge line L4.

The pulverized coal supply facility 112 supplies the pulverized coal which is produced by the pulverized coal production facility 111 to the gasification furnace 113.

The pulverized coal which is produced by the pulverized coal production facility 111 is supplied to the gasification furnace 113. Further, a gasification agent (air, oxygen, steam, or the like) is supplied from a device (not illustrated) to the gasification furnace 113. The gasification furnace 113 generates a combustible gas (a coal gas) mainly containing carbon monoxide and hydrogen by causing a reaction of the coal and the gasification agent (air, oxygen, steam, or the like) supplied thereinto.

Here, the operation of the coal gasification combined power generation system 100 of the first embodiment will be described.

In the coal gasification combined power generation system 100 of the first embodiment, the pulverized coal production facility 111 produces the pulverized coal by pulverizing and drying the raw coal, and the pulverized coal supply facility 112 supplies the produced pulverized coal to the gasification furnace 113.

The gasification furnace 113 may generate a combustible gas (a coal gas) mainly containing carbon monoxide and hydrogen by causing a reaction between the pulverized coal supplied thereto with the gasification agent. Then, the combustible gas is supplied from the gasification furnace 113 to the gas purification device 115 through a gas generation line L5.

The combustible gas becomes a pure gas obtained by removing impurities such as a sulfuric compound, a nitrogen compound, and mercury from the combustible gas in the gas purification device 115, and hence a fuel gas is produced. Then, the gas turbine facility 117 generates a power by the combustion of the purified fuel gas.

Further, the combustion flue gas which is discharged from the gas turbine facility 117 is subjected to a heat exchange process in the exhaust heat recovery boiler 120 so as to generate vapor, and the generated vapor is supplied to the steam turbine facility 118. The steam turbine facility 118 generates power by the vapor supplied from the exhaust heat recovery boiler 120.

Subsequently, the combustion flue gas which is discharged from the exhaust heat recovery boiler 120 is purified, and the purified combustion flue gas is discharged from the stack 106 to the atmosphere.

Next, the mercury removal system 1 which is provided in the gasification system 105 of the coal gasification combined power generation system 100 will be described in detail with reference to FIG. 2. The mercury removal system 1 removes the gasified mercury contained in the dry flue gas which is generated when the raw coal is dried and pulverized by the coal pulverizer 122.

As illustrated in FIG. 2, the mercury removal system 1 is provided around the pulverized coal production facility 111. The mercury removal system 1 includes a removal agent supply device 11 which supplies a mercury removal agent. The removal agent supply device 11 supplies the removal agent to the upstream side of the pulverized coal dust collector 123 in the pulverized coal circulation direction. Here, the mercury removal agent may be powder or lump. Further, as the mercury removal, agent, for example, the activated coal, chloride such as calcium chloride, or char which does not cause a reaction in the powder raw material generated by the production of the gasified gas, and is used as a removal agent that removes mercury in an absorbed state.

Specifically, in the first embodiment, the removal agent supply device 11 supplies the mercury removal agent to the pulverized coal supply line (the powder raw material supply line) L3 in which the pulverized coal and the dry flue gas flowing into the pulverized coal dust collector 123 circulate, and supplies mercury removal powder which is powder as the mercury removal agent.

The removal agent supply device 11 includes a mercury removal powder silo (a storage tank) 21 which stores the mercury removal powder and a powder supply line (a mercury removal agent supply line) L12 which connects the mercury removal powder silo 21 to the pulverized coal supply line L3. Further, the removal agent supply device 11 carries the mercury removal powder stored in the mercury removal, powder silo 21 through an air stream by circulating a carrying medium (nitrogen, air, or the like) inside the powder supply line L12. Then, the removal agent supply device 11 supplies the mercury removal powder carried through an air stream inside the powder supply line L12 to the pulverized coal supply line L3.

Here, the length of the pulverized coal supply line L3 from the connection portion between the powder supply line L12 and the pulverized coal supply line L3 to the pulverized coal dust collector 123 becomes a length capable of ensuring a predetermined contact time in which the mercury removal powder may absorb the gasified mercury contained in the dry flue gas. That is, the length of the pulverized coal supply line L3 between the connection portion and the pulverized coal dust collector 123 becomes a length which is obtained by multiplying the flow rate of the dry flue gas of the pulverized coal supply line L3 with a predetermined contact time, and the predetermined contact time becomes, for example, 1.5 seconds or more (desirably, 2.5 seconds or more).

In such a mercury removal system 1, when the mercury removal powder which is supplied from the mercury removal powder silo 21 is carried through the air stream using the carrying medium circulating in the powder supply line L12, the mercury removal powder which is carried through the air stream is supplied to the pulverized coal supply line L3 through the powder supply line L12. The mercury removal powder which is supplied to the pulverized coal supply line L3 is mixed with the pulverized coal and the dry flue gas circulating in the pulverized coal supply line L3 (a removal agent mixing step). At this time, since the gasified mercury which is contained in the dry flue gas contacts the mercury removal powder mixed with the dry flue gas, the gasified mercury is adsorbed to the mercury removal powder.

Then, the mercury removal powder that adsorbs the mercury flows from the pulverized coal supply line L3 into the pulverized coal dust collector 123 along with the dry flue gas. The mercury removal powder which flows into the pulverized coal dust collector 123 is separated into the pulverized coal, the mercury removal powder, and the dry flue gas. Here, the pulverized coal and the mercury removal powder which are separated as described above are supplied to the gasification furnace 113 by the pulverized coal supply facility 112, and the separated dry flue gas is discharged from the gas discharge line L4 (a dust collecting step). Furthermore, the mercury removal powder to which the mercury is absorbed and which is supplied to the gasification furnace 113 becomes ash and a gas in a hot and dry state inside the gasification furnace 113. The ash in the mercury removal powder is discharged along with the ash in the coal. Meanwhile, hydrocarbon in the mercury removal powder is gasified so as to become carbon monoxide or hydrogen. Here, the mercury which is adsorbed to the mercury removal powder becomes gasified mercury, is mixed with a produced gas, and flows into the gas purification device 115 so as to be treated in the gas purification device 115.

As described above, according to the configuration of the first embodiment, since the removal agent supply device 11 may supply the mercury removal powder to the pulverized coal supply line L3 in which the pulverized coal and the dry flue gas circulate, the gasified mercury which is contained in the dry flue gas generated by the pulverization of the raw coal may be removed by using the mercury removal powder. Further, the mercury removal powder which is supplied to the dry flue gas is subjected to a dust collection process by the pulverized coal dust collector 123, and hence the dry flue gas from which the mercury is removed may be discharged as a pure gas from the pulverized coal dust collector 123. Accordingly, since the gasified mercury in the dry flue gas flowing into the pulverized coal dust collector 123 is removed and is discharged as a pure gas from the pulverized coal dust collector 123, it is possible to improve the environmental performance of the coal gasification combined power generation system 100 including the gasification system 105. At this time, since the pulverized coal dust collector 123 becomes a device necessary for generating the gasified gas, the dust of the mercury removal agent may be collected by using the pulverized coal dust collector 123, and hence the system configuration may be simplified.

Second Embodiment

Figure 3:
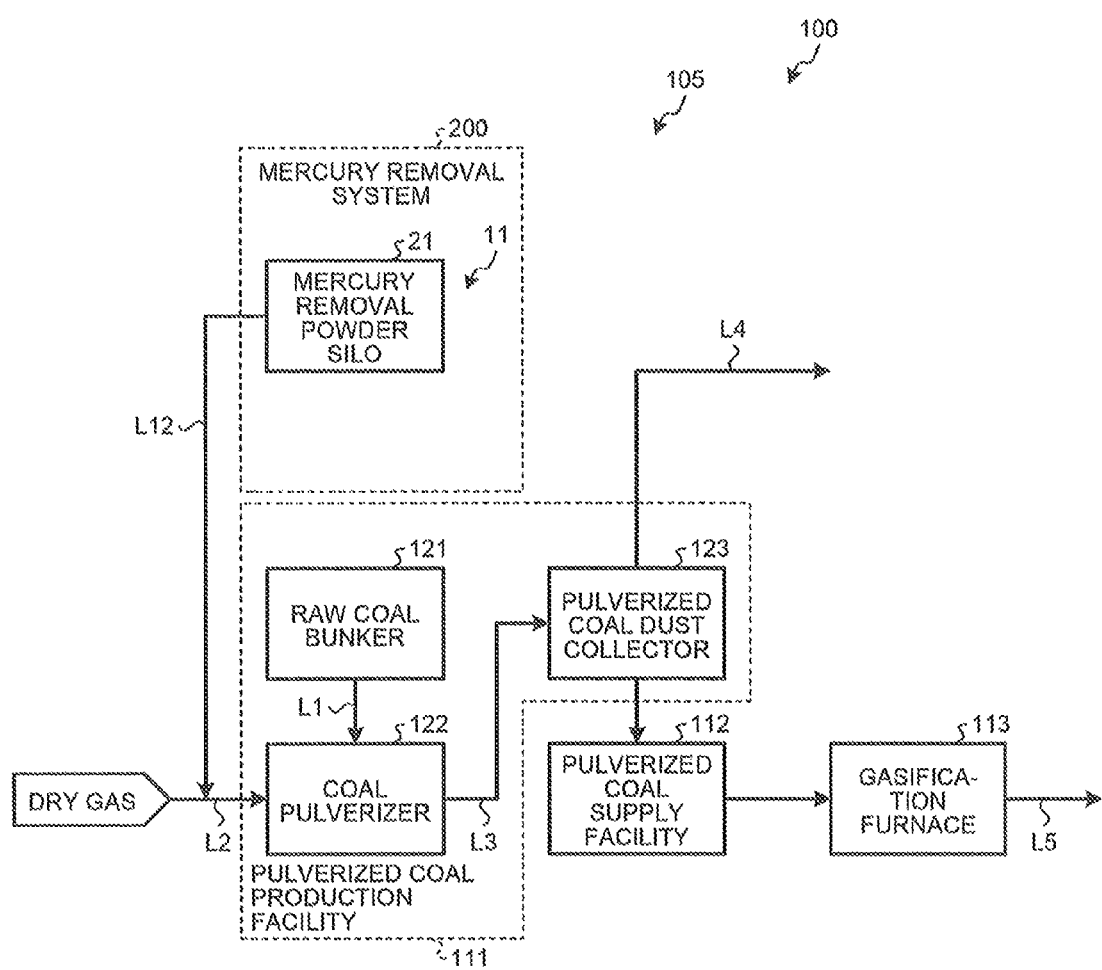
FIG. 3 is a schematic configuration diagram schematically illustrating the configuration of a mercury removal system according to a second embodiment.

Next, a mercury removal system 200 according to a second embodiment will be described with reference to FIG. 3. FIG. 3 is a schematic configuration diagram schematically illustrating the configuration of a mercury removal system according to the second embodiment. Furthermore, in the second embodiment, a difference from the first embodiment will be described so as to prevent the repetitive description, and the same reference numerals will be given to the same components as the first embodiment. In the mercury removal system 1 according to the first embodiment, the mercury removal agent is supplied to the pulverized coal supply line L3, but in the mercury removal system 200 according to the second embodiment, the mercury removal agent is supplied to the dry gas supply line L2. Hereinafter, the mercury removal system 200 according to the second embodiment will be described. Furthermore, also in the second embodiment, the mercury removal powder which is powder is used as the mercury removal agent.

As illustrated in FIG. 3, in the mercury removal system 200 according to the second embodiment, the removal agent supply device 11 includes the mercury removal powder silo 21 which stores the mercury removal powder and the powder supply line L12 which connects the mercury removal powder silo 21 to the dry gas supply line L2. Furthermore, since the mercury removal powder silo 21 has the same configuration as the first embodiment, the repetitive description will not be presented. Further, since the configuration in which the mercury removal agent circulating in the powder supply line L12 is carried through the air stream is the same as the first embodiment, the repetitive description will not be presented.

In such a mercury removal system 200, when the mercury removal powder supplied from the mercury removal powder silo 21 is carried by the carrying medium circulating in the powder supply line L12 through the air stream, the mercury removal powder which is carried through the air stream is supplied to the dry gas supply line L2 through the powder supply line L12. The mercury removal powder supplied to the dry gas supply line L2 flows into the coal pulverizer 122 along with the dry gas through the dry gas supply line L2. The dry gas and the mercury removal powder which flow into the coal pulverizer 122 are mixed with the pulverized coal pulverized by the coal pulverizer 122. For this reason, the gasified mercury which is generated by pulverizing and drying the raw coal contacts the mercury removal powder supplied to the coal pulverizer 122 along with the dry gas, and is absorbed to the mercury removal powder. Furthermore, the mercury removal agent may be supplied as the mercury removal powder as powder to the pulverized coal supply line L3. Since the mercury removal agent may be pulverized by the pulverizing machine, the mercury removal agent as the lump may be directly supplied to the pulverizing machine, and the mercury removal powder as the powder may be directly supplied to the pulverizing machine.

Then, the mercury removal powder absorbing the mercury is discharged from the coal pulverizer 122 to the pulverized coal supply line L3 along with the pulverized coal and the dry flue gas, and flows from the pulverized coal supply line L3 to the pulverized coal dust collector 123. The mercury removal powder which flows into the pulverized coal dust collector 123 is separated into the pulverized coal, the mercury removal powder, and the dry flue gas. Here, the pulverized coal and the mercury removal powder which are separated as described above are supplied to the gasification furnace 113 by the pulverized coal supply facility 112, and the separated dry flue gas is discharged from the gas discharge line L4.

As described above, according to the configuration of the second embodiment, since the removal agent supply device 11 may supply the mercury removal powder to the dry gas supply line L2 in which the dry gas circulates, it is possible to remove the gasified mercury which is contained in the dry flue gas generated by the pulverization of the raw coal by using the mercury removal powder. Further, the mercury removal powder supplied to the dry gas may be subjected to the dust collection process by the pulverized coal dust collector 123, and hence the dry flue gas from which the mercury is removed may be discharged as a pure gas from the pulverized coal dust collector 123. Accordingly, since the gasified mercury is removed from the dry flue gas flowing into the pulverized coal dust collector 123 and hence the gas may be discharged as the pure gas from the pulverized coal dust collector 123, it is possible to improve the environmental performance of the mercury removal system 200.

Further, according to the configuration of the second embodiment, since the mercury removal powder may be supplied to the dry gas supply line L2, the pulverized coal pulverized by the coal pulverizer 122 may be mixed with the mercury removal, powder at the early timing, and hence the contact time between the gasified mercury in the dry flue gas and the mercury removal powder may be lengthened. As a result, the mercury removal efficiency of the mercury removal system 200 may be improved.

Third Embodiment

Figure 4:
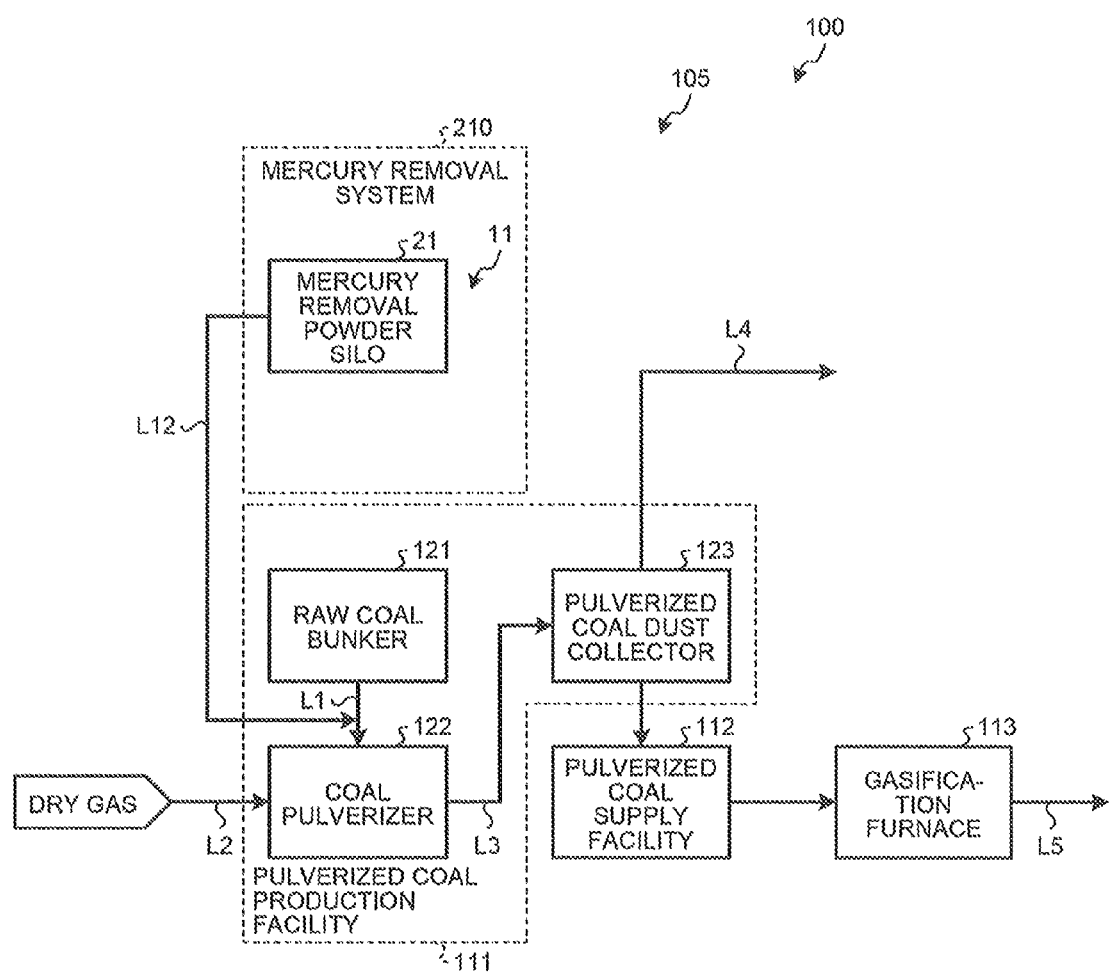
FIG. 4 is a schematic configuration diagram schematically illustrating the configuration of a mercury removal system according to a third embodiment.

Next, a mercury removal system 210 according to a third embodiment will be described with reference to FIG. 4. FIG. 4 is a schematic configuration diagram schematically illustrating the configuration of a mercury removal system according to the third embodiment. Furthermore, also in the third embodiment, a difference from the first and second embodiments will be described so as to prevent the repetitive description, and the same reference numerals will be given to the same components as the first and second embodiments. In the mercury removal system 1 according to the first embodiment, the mercury removal agent is supplied to the pulverized coal supply line L3, but in the mercury removal system 210 according to the third embodiment, the mercury removal agent is supplied to the raw coal supply line L1. Hereinafter, the mercury removal system 210 according to the third embodiment will be described. Furthermore, also in the third embodiment, the mercury removal powder as the powder is used as the mercury removal agent, but the mercury removal agent as the lump may be used.

As illustrated in FIG. 4, in the mercury removal system 210 according to the third embodiment, the removal agent supply device 11 includes the mercury removal powder silo 21 which stores the mercury removal powder and the powder supply line L12 which connects the mercury removal powder silo 21 to the raw coal supply line L1. Furthermore, since the mercury removal powder silo 21 has the same configuration as the first embodiment, the repetitive description will not be presented. Further, since the configuration in which the mercury removal agent circulating in the powder supply line L12 is carried through the air stream is the same as the first embodiment, the repetitive description will not be presented.

In such a mercury removal system 210, when the mercury removal powder supplied from the mercury removal powder silo 21 is carried by the carrying medium circulating in the powder supply line L12 through the air stream, the mercury removal powder which is carried through the air stream is supplied to the raw coal supply line L1 through the powder supply line L12. The mercury removal powder supplied to the raw coal supply line L1 flows into the coal pulverizer 122 along with the raw coal through the raw coal supply line L1. The raw coal and the mercury removal powder which flow into the coal pulverizer 122 are mixed with the dry gas supplied in the coal pulverizer 122. For this reason, the gasified mercury which is generated by pulverizing and drying the raw coal is adsorbed to the mercury removal powder while contacting the mercury removal powder supplied to the coal pulverizer 122 along with the raw coal. Furthermore, the mercury removal agent may be supplied to the pulverized coal supply line L3 as the mercury removal powder as the powder. Furthermore, since the mercury removal agent may be pulverized by the pulverizing machine, the mercury removal agent as the lump may be directly supplied to the pulverizing machine, and the mercury removal powder as the powder may be directly supplied to the pulverizing machine.

Then, the mercury removal powder absorbing the mercury is discharged from the coal pulverizer 122 to the pulverized coal supply line L3 along with the pulverized coal and the dry flue gas, and flows from the pulverized coal supply line L3 to the pulverized coal dust collector 123. The mercury removal powder which flows into the pulverized coal dust collector 123 is separated into the pulverized coal, the mercury removal powder, and the dry flue gas. Here, the pulverized coal and the mercury removal powder which are separated as described above are supplied to the gasification furnace 113 by the pulverized coal supply facility 112, and the separated dry flue gas is discharged from the gas discharge line L4.

As described above, according to the configuration of the third embodiment, since the removal agent supply device 11 may supply the mercury removal powder to the raw coal supply line L1 in which the raw coal circulates, it is possible to remove the gasified mercury which is contained in the dry flue gas generated by the pulverization of the raw coal by using the mercury removal powder. Further, the mercury removal, powder supplied to the raw coal is subjected to the dust collection process by the pulverized coal dust collector 123, and hence the dry flue gas from which the mercury is removed may be discharged as a pure gas from the pulverized coal dust collector 123. Accordingly, since the gasified mercury is removed from the dry flue gas flowing into the pulverized coal dust collector 123 and hence the gas may be discharged as the pure gas from the pulverized coal dust collector 123, the environmental performance of the mercury removal system 210 may be improved.

Further, according to the configuration of the third embodiment, since the mercury removal powder may be supplied to the raw coal supply line L1, the pulverized coal pulverized by the coal pulverizer 122 and the mercury removal powder may be mixed with each other at the early timing, and hence the contact time between the gasified mercury in the dry flue gas and the mercury removal powder may be lengthened. As a result, the mercury removal efficiency of the mercury removal system 210 may be improved.

Fourth Embodiment

Figure 5:
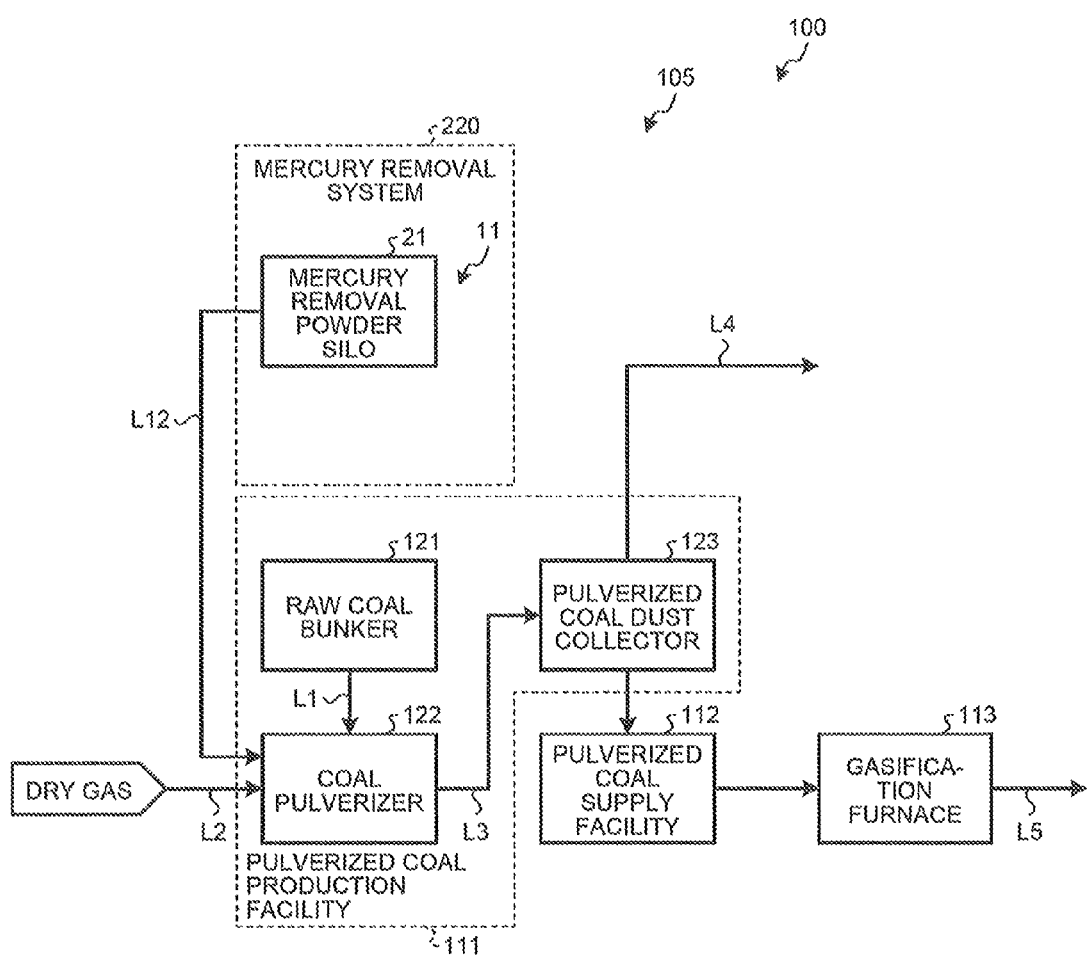
FIG. 5 is a schematic configuration diagram schematically illustrating the configuration of a mercury removal system according to a fourth embodiment.

Next, a mercury removal system 220 according to a fourth embodiment will be described with reference to FIG. 5. FIG. 5 is a schematic configuration diagram schematically illustrating the configuration of a mercury removal system according to the fourth embodiment. Furthermore, also in the fourth embodiment, a difference from the first to third embodiments will be described so as to prevent the repetitive description, and the same reference numerals will be given to the same components as the first to third embodiments. In the mercury removal system 1 according to the first embodiment, the mercury removal agent is supplied to the pulverized coal supply line L3, but in the mercury removal system 220 according to the fourth embodiment, the mercury removal agent is supplied to the coal pulverizer 122. Hereinafter, the mercury removal system 220 according to the fourth embodiment will be described. Furthermore, also in the fourth embodiment, the mercury removal powder as the powder is used as the mercury removal agent, but the mercury removal agent as the lump may be used.

As illustrated in FIG. 5, in the mercury removal system 220 according to the fourth embodiment, the removal agent supply device 11 includes the mercury removal powder silo 21 which stores the mercury removal powder and the powder supply line L12 which connects the mercury removal powder silo 21 to the coal pulverizer 122. Furthermore, since the mercury removal powder silo 21 has the same configuration as the first embodiment, the repetitive description will not be presented. Further, since the configuration in which the mercury removal agent circulating in the powder supply line L12 is carried through the air stream is the same as the first embodiment, the repetitive description will not be presented.

In such a mercury removal system 220, when the mercury removal powder supplied from the mercury removal powder silo 21 is carried by the carrying medium circulating in the powder supply line L12 through the air stream, the mercury removal powder which is carried through the air stream is supplied to the coal pulverizer 122 through the powder supply line L12. The mercury removal powder supplied to the coal pulverizer 122 is mixed with the pulverized coal and the dry flue gas of the coal pulverizer 122. For this reason, the gasified mercury which is generated by pulverizing and drying the raw coal is adsorbed to the mercury removal powder while contacting the mercury removal powder directly supplied to the coal pulverizer 122. Furthermore, since the mercury removal agent may be pulverized by the coal pulverizer 122, the mercury removal agent as the lump may be supplied to the raw coal supply line L1 or the mercury removal powder as the powder may be supplied to the raw coal supply line L1. Furthermore, since the mercury removal agent may be pulverized by the coal pulverizer 122, the mercury removal agent as the lump may be directly supplied to the coal pulverizer 122 or the mercury removal powder as the powder may be directly supplied to the coal pulverizer 122.

Then, the mercury removal powder absorbing the mercury is discharged from the coal pulverizer 122 to the pulverized coal supply line L3 along with the pulverized coal and the dry flue gas, and flows from the pulverized coal supply line L3 to the pulverized coal dust collector 123. The mercury removal powder which flows into the pulverized coal dust collector 123 is separated into the pulverized coal, the mercury removal powder, and the dry flue gas. Here, the pulverized coal and the mercury removal powder which are separated as described above are supplied to the gasification furnace 113 by the pulverized coal supply facility 112, and the separated dry flue gas is discharged from the gas discharge line L4.

As described above, according to the configuration of the fourth embodiment, since the removal agent supply device 11 may supply the mercury removal powder to the coal pulverizer 122, it is possible to remove the gasified mercury which is contained in the dry flue gas generated by the pulverization of the raw coal by using the mercury removal powder. Further, the mercury removal powder supplied to the coal pulverizer 122 is subjected to the dust collection process by the pulverized coal dust collector 123, and hence the dry flue gas from which the mercury is removed may be discharged as a pure gas from the pulverized coal dust collector 123. Accordingly, since the gasified mercury is removed from the dry flue gas flowing into the pulverized coal dust collector 123 and hence the gas may be discharged as the pure gas from the pulverized coal dust collector 123, it is possible to improve the environmental performance of the mercury removal system 200.

Further, according to the configuration of the fourth embodiment, since the mercury removal powder may be directly supplied to the coal pulverizer 122, the pulverized coal pulverized by the coal pulverizer 122 may be mixed with the mercury removal powder at the early timing, and hence the contact time between the gasified mercury in the dry flue gas and the mercury removal powder may be lengthened. As a result, the mercury removal efficiency of the mercury removal system 220 may be improved.

Fifth Embodiment

Figure 6:
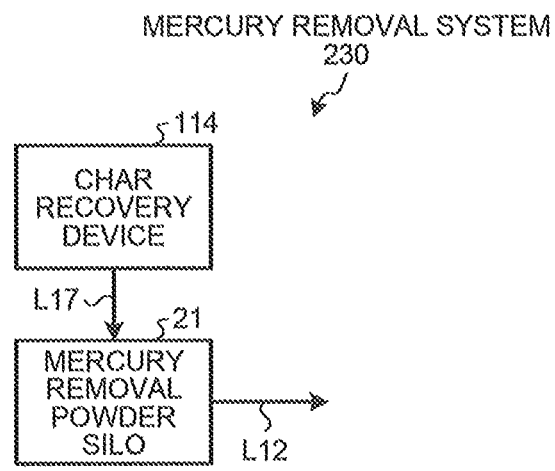
FIG. 6 is a schematic configuration diagram schematically illustrating a part of a mercury removal system according to a fifth embodiment.

Next, a mercury removal system 230 according to a fifth embodiment will be described with reference to FIG. 6. FIG. 6 is a schematic configuration diagram schematically illustrating a part of a mercury removal system according to the fifth embodiment. Furthermore, also in the fifth embodiment, a difference from the first to fourth embodiments will be described so as to prevent the repetitive description, and the same reference numerals will be given to the same components as the first to fourth embodiments. The mercury removal system 230 according to the fifth embodiment has a configuration in which the mercury removal powder silo 21 of the first to fourth embodiments additionally includes a char supply line L17 that collects char as an unreacted element of the pulverized coal generated due to the generation of the gasified gas by a char recovery device 114 and supplies the char. Hereinafter, the mercury removal system 230 according to the fifth embodiment will be described.

As illustrated in FIG. 6, the mercury removal system 230 according to the fifth embodiment further includes the char supply line L17 that connects the mercury removal powder silo 21 to the char recovery device 114 in addition to the configurations of the mercury removal systems 1, 200, 210, and 220 of the first to fourth embodiments. The char supply line L17 supplies the char collected by the char recovery device 114 to the mercury removal powder silo 21. The mercury removal powder silo 21 stores the char as the mercury removal powder.

As described above, according to the configuration of the fifth embodiment, since the char generated by the production of the gasified gas may be used as the mercury removal powder, there is no need to provide a dedicated mercury removal powder, and the production cost may be decreased.

Sixth Embodiment

Figure 7:
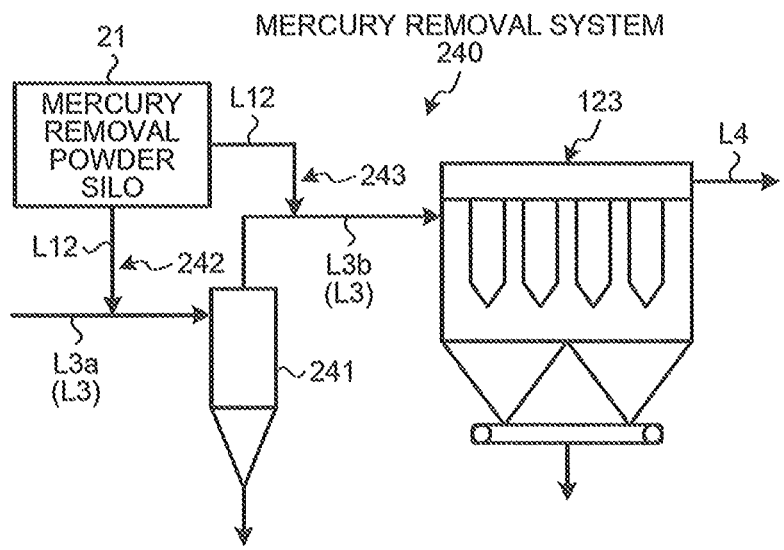
FIG. 7 is a schematic configuration diagram schematically illustrating a part of a mercury removal system according to a sixth embodiment.

Next, a mercury removal system 240 according to a sixth embodiment will be described with reference to FIG. 7. FIG. 7 is a schematic configuration diagram schematically illustrating a part of a mercury removal system according to the sixth embodiment. Furthermore, also in the sixth embodiment, a difference from the first to fifth embodiments will be described so as to prevent the repetitive description, and the same reference numerals will be given to the same components as the first to fifth embodiments. The mercury removal system 240 according to the sixth embodiment is configured as a so-called double injection type in which the mercury removal powder is supplied from two positions to the pulverized coal supply line L3 of the first to fifth embodiments. Hereinafter, the mercury removal system 240 according to the sixth embodiment will be described.

As illustrated in FIG. 7, the mercury removal system 240 according to the sixth embodiment includes a solid-gas separator 241 which is provided in the pulverized coal supply line L3 and a first supply nozzle 242 and a second supply nozzle 243 which are provided in the pulverized coal supply line L3.

The solid-gas separator 241 is a so-called cyclone dust collector, and is provided in the pulverized coal supply line L3. The solid-gas separator 241 collects the dust of a part of the pulverized coal and the mercury removal powder circulating in an upstream pulverized coal supply line L3a from the coal pulverizer 122 to the solid-gas separator 241. For this reason, the solid-gas separator 241 discharges a part of the pulverized coal and the mercury removal powder subjected to the dust collection process, and discharges the pulverized coal and the mercury removal powder as the remaining separated elements to a downstream pulverized coal supply line L3b along with the dry flue gas. For this reason, the solid-gas separator 241 is interposed between the upstream and downstream pulverized coal supply lines, the concentration of the pulverized coal is high in the upstream pulverized coal supply line (the first powder raw material supply line) L3a, and the concentration of the pulverized coal is low in the downstream pulverized coal supply line (the second powder raw material supply line) L3b.

The first supply nozzle 242 is provided in the upstream pulverized coal supply line L3a from the coal pulverizer 122 to the solid-gas separator 241, and injects the mercury removal powder to the upstream pulverized coal supply line L3a. The second supply nozzle 243 is provided in the downstream pulverized coal supply line L3b from the solid-gas separator 241 to the pulverized coal dust collector 123, and injects the mercury removal powder to the downstream pulverized coal supply line L3b.

Here, two powder supply lines L12 are connected to the mercury removal powder silo 21, one powder supply line L12 is connected to the first supply nozzle 242, and the other powder supply line L12 is connected to the second supply nozzle 243.

Here, the mercury removal powder which is injected from the first supply nozzle 242 is mixed with the pulverized coal and the dry flue gas circulating in the upstream pulverized coal supply line L3a. At this time, the gasified mercury contained in the dry flue gas is absorbed to the mercury removal powder while contacting the mercury removal powder mixed with the dry flue gas. Subsequently, the mercury removal powder absorbing the mercury flows from the upstream pulverized coal supply line L3a into the solid-gas separator 241 along with the pulverized coal and the dry flue gas. The solid-gas separator 241 collects the dust from a part of the pulverized coal and the mercury removal powder, and discharges a part of the pulverized coal and the mercury removal powder subjected to the dust collection process. Meanwhile, the solid-gas separator 241 discharges the pulverized coal and the mercury removal powder as the remaining separated elements to the downstream pulverized coal supply line L3b along with the dry flue gas. Here, the particle subjected to the dust collection process by the solid-gas separator 241 is a particle having a large particle diameter, and most of the mercury removal powder having a large particle diameter is discharged without the dust collection process.

Then, the mercury removal powder which is injected from the second supply nozzle 243 is mixed with the dry flue gas containing the mercury removal powder and the pulverized coal not subjected to the dust collection process by the solid-gas separator 241 and circulating in the downstream pulverized coal supply line L3b. At this time, the gasified mercury contained in the dry flue gas is absorbed to the mercury removal powder while contacting a new (fresh) mercury removal powder mixed with the dry flue gas. Subsequently, the mercury removal powder absorbing the mercury flows from the downstream pulverized coal supply line L3b into the pulverized coal dust collector 123 along with the pulverized coal and the dry flue gas. The pulverized coal and the mercury removal powder which flow into the pulverized coal dust collector 123 are separated from the dry flue gas. Here, the pulverized coal and the mercury removal powder which are separated as described above are discharged toward the pulverized coal supply facility 112, and the separated dry flue gas is discharged as the pure gas from the gas discharge line L4.

As described above, according to the configuration of the sixth embodiment, the mercury removal powder which is supplied from the first supply nozzle 242 may contact the dry flue gas for a long staying time in the upstream pulverized coal supply line L3a between the coal pulverizer 122 and the solid-gas separator 241. Further, the solid-gas separator 241 may collect the dust having a comparatively large particle diameter, but may not collect the dust having a fine particle diameter. For this reason, the pulverized coal is separated, but the mercury removal powder supplied from the first supply nozzle 242 remains in the dry flue gas while the dust is not collected. Furthermore, fresh mercury removal powder may be supplied from the second supply nozzle 243 in the downstream pulverized coal supply line L3b between the solid-gas separator 241 and the pulverized coal dust collector 123. For this reason, since it is possible to ensure a long contact time between the mercury removal, powder and the mercury in the dry flue gas in the upstream pulverized coal supply line L3a, it is possible to remove the mercury by supplying fresh mercury removal powder having a high mercury absorption ability in the downstream pulverized coal supply line L3b, and hence to improve the mercury removal efficiency of the mercury removal system 240.

Seventh Embodiment

Figure 8:
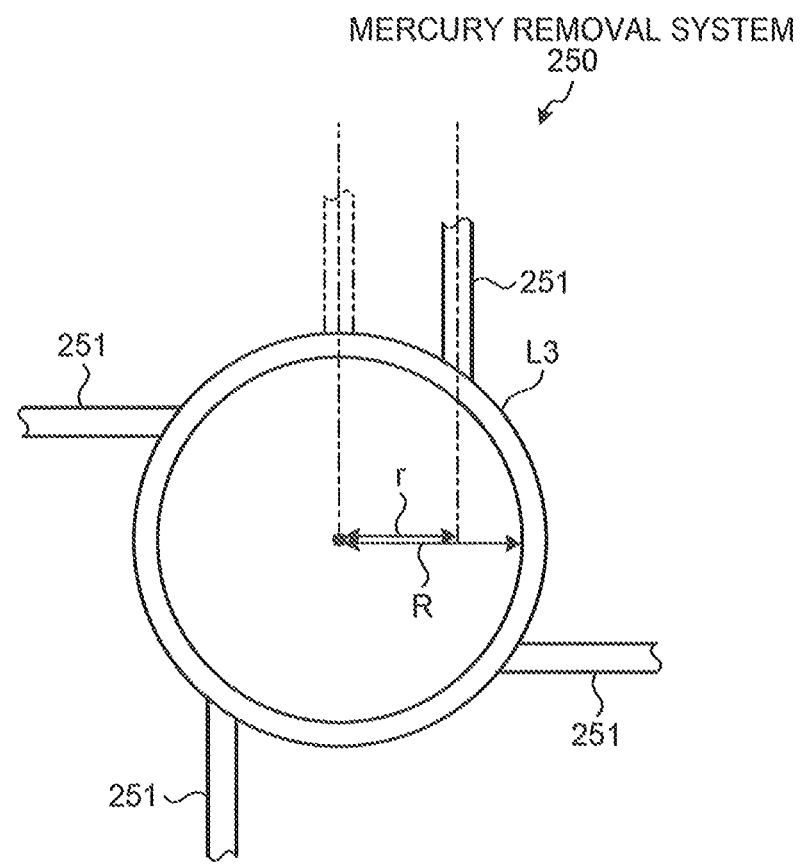
FIG. 8 is a cross-sectional view schematically illustrating the peripheral configuration of a pulverized coal supply line of a mercury removal system according to a seventh embodiment.
Figure 9:
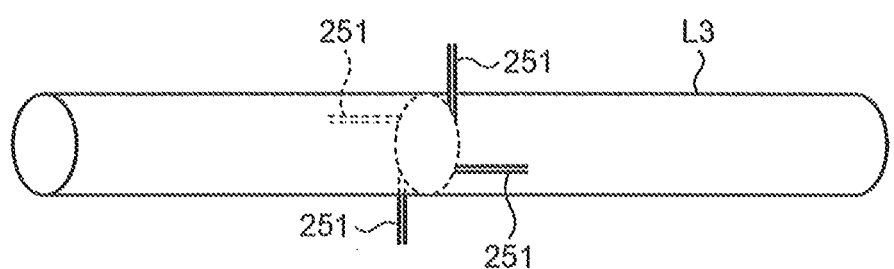
FIG. 9 is an explanatory diagram schematically illustrating the peripheral configuration of the pulverized coal supply line of the mercury removal system according to the seventh embodiment.

Next, a mercury removal system 250 according to a seventh embodiment will be described with reference to FIGS. 8 and 9. FIG. 8 is a cross-sectional view schematically illustrating the peripheral configuration of a pulverized coal supply line of a mercury removal system according to the seventh embodiment, and FIG. 9 is an explanatory diagram schematically illustrating the peripheral configuration of the pulverized coal supply line of the mercury removal system according to the seventh embodiment. Furthermore, also in the seventh embodiment, a difference from the first to sixth embodiments will be described so as to prevent the repetitive description, and the same reference numerals will be given to the same components as the first to sixth embodiments. The mercury removal system 250 according to the seventh embodiment has a configuration in which the mercury removal powder is injected from a plurality of supply nozzles 251 to the pulverized coal supply line L3 of the first to sixth embodiments. Hereinafter, the mercury removal system 250 according to the seventh embodiment will be described.

As illustrated in FIG. 8, the mercury removal system 250 according to the seventh embodiment further includes a plurality of supply nozzles 251 which are provided in the pulverized coal supply line L3. At this time, the pulverized coal supply line L3 is formed as a cylindrical tube. Furthermore, the powder supply line L12 is connected to the plurality of supply nozzles 251, and supply the mercury removal powder from the powder supply line L12.

The plurality of supply nozzles 251 are provided at a predetermined interval in the circumferential direction of the pulverized coal supply line L3 in the cross-section (the tube cross-section) taken along the plane perpendicular to the tube axis direction of the pulverized coal supply line L3 as the cylindrical tube. For this reason, the plurality of supply nozzles 251 are provided along the tube wall in the tube cross-section. Further, as illustrated in FIG. 9, the plurality of supply nozzles 251 are provided at the same position in the tube axis direction of the pulverized coal supply line L3. The plurality of supply nozzles 251 are disposed so that the mercury removal powder supplied to the pulverized coal supply line L3 is located at the area center position. Specifically, the plurality of supply nozzles 251 are disposed as illustrated in FIG. 8.

Here, each supply nozzle 251 is formed as a cylindrical tube. In the cross-section illustrated in FIG. 8, a predetermined radius in a predetermined radial direction of the pulverized coal supply line L3 is indicated by R. Further, each supply nozzle 251 is disposed so that the tube axis direction thereof is perpendicular to the predetermined radial direction (on the radius R) of the pulverized coal supply line L3. At this time, the distance from the center of the pulverized coal supply line L3 on the radius R to each supply nozzle 251 perpendicular to the predetermined radial direction is indicated by r. That is, the distance r becomes the distance between the center of the cylindrical tube and the extension line of the axis direction of each supply nozzle 251. In this case, each supply nozzle 251 is disposed in the range of "$0 \leq r \leq \frac{2}{3}R$".

Since the plurality of supply nozzles 251 are disposed as illustrated in FIG. 8, the mercury removal powder injected from each supply nozzle 251 may supply the dry flue gas circulating in the pulverized coal supply line L3 to the area center position of the pulverized coal supply line L3. Since the mercury removal agent may be rapidly and uniformly dispersed by supplying the mercury removal agent to the area center position of the pulverized coal supply line L3, the contact time between the mercury removal agent and the mercury in the dry flue gas may be lengthened, and hence the mercury removal efficiency may be improved. Furthermore, the area center position indicates the center position of the area inside the pulverized coal supply line L3 divided by the number of the supply nozzles 251 in the vicinity of each jet flow in the supply nozzles 251 provided in the pulverized coal supply line L3.

As described above, according to the configuration of the seventh embodiment, the plurality of supply nozzles 251 may supply the dry flue gas circulating in the pulverized coal supply line L3 to the area center position of the pulverized coal supply line L3, and hence may promptly mix the mercury removal powder with the dry flue gas. As a result, the contact time between the mercury removal powder and the gasified mercury in the dry gas may be lengthened, and hence the mercury removal efficiency of the mercury removal system 250 may be improved.

Furthermore, in the seventh embodiment, the plurality of supply nozzles 251 are provided in the pulverized coal supply line L3, but a single supply nozzle 251 may be provided in the pulverized coal supply line L3.

Eighth Embodiment

Figure 10:
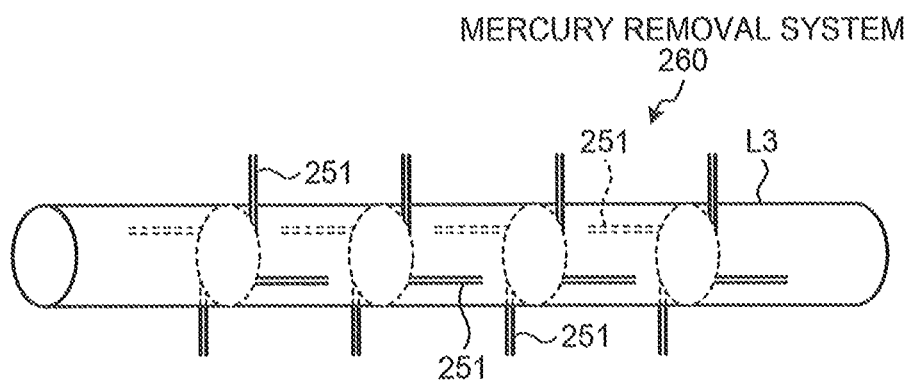
FIG. 10 is an explanatory diagram schematically illustrating the peripheral configuration of a pulverized coal supply line of a mercury removal system according to an eighth embodiment.

Next, a mercury removal system 260 according to an eighth embodiment will be described with reference to FIG. 10. FIG. 10 is an explanatory diagram schematically illustrating the peripheral configuration of a pulverized coal supply line of a mercury removal system according to the eighth embodiment. Furthermore, also in the eighth embodiment, a difference from the first to seventh embodiments will be described so as to prevent the repetitive description, and the same reference numerals will be given to the same components as the first to seventh embodiments. The mercury removal system 260 according to the eighth embodiment has a configuration in which the plurality of supply nozzles 251 of the mercury removal system 250 of the seventh embodiment are disposed in a different way. Hereinafter, the mercury removal system 260 according to the eighth embodiment will be described.

As illustrated in FIG. 10, the mercury removal system 260 according to the eighth embodiment has a configuration in which the plurality of supply nozzles 251 of the mercury removal system 250 of the seventh embodiment are disposed at a predetermined interval in the tube axis direction of the pulverized coal supply line L3.

As described above, according to the configuration of the eighth embodiment, the plurality of supply nozzles 251 may uniformly supply the mercury removal powder from the center of the gas flow inside the pulverized coal supply line L3 in the circulation direction of the pulverized coal supply line L3 to the outer peripheral portion thereof, and hence the mercury removal powder having a high absorption ability may further repeatedly contact the dry flue gas. Accordingly, the contact time between the mercury removal powder and the mercury in the dry flue gas may be lengthened, and the mercury removal powder having a high absorption ability may be supplied to an area having a low mercury concentration for the purpose of the contact. As a result, the mercury removal efficiency of the mercury removal system 260 may be improved.

Ninth Embodiment

Figure 11:
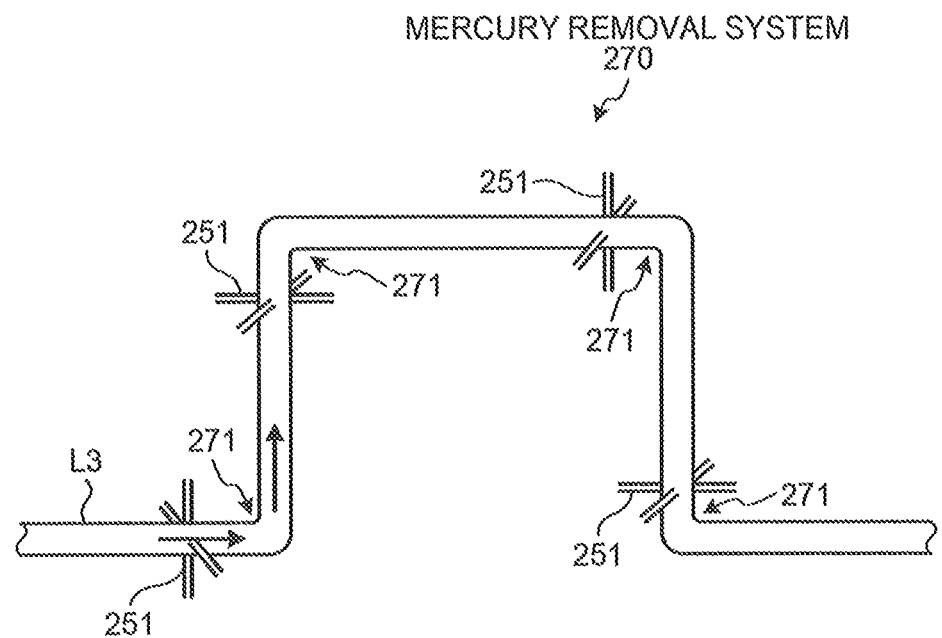
FIG. 11 is an explanatory diagram schematically illustrating the peripheral configuration of a pulverized coal supply line of a mercury removal system according to a ninth embodiment.

Next, a mercury removal system 270 according to a ninth embodiment will be described with reference to FIG. 11. FIG. 11 is an explanatory diagram schematically illustrating the peripheral configuration of a pulverized coal supply line of a mercury removal system according to the ninth embodiment. Furthermore, also in the ninth embodiment, a difference from the first to eighth embodiments will be described so as to prevent the repetitive description, and the same reference numerals will be given to the same components as the first to eighth embodiments. The mercury removal system 270 according to the ninth embodiment has a configuration in which the pulverized coal supply line L3 is provided with a curved portion 271. Hereinafter, the mercury removal system 270 according to the ninth embodiment will be described.

As illustrated in FIG. 11, the mercury removal system 270 according to the ninth embodiment has a configuration in which the pulverized coal supply line L3 is provided with at least one curved portion 271 and the plurality of curved portions 271 are provided with the plurality of supply nozzles 251 of the seventh and eighth embodiments. At least one supply nozzle 251 of the plurality of supply nozzles 251 is provided in the vicinity of the upstream entrance of the curved portion 271 in the pulverized coal supply line L3.

For example, four curved portions 271 are provided in the pulverized coal supply line L3. The supply nozzle 251 provided in each curved portion 271 is disposed at the upstream side of the curved portion 271.

As described above, according to the configuration of the ninth embodiment, since it is possible to promote the operation of mixing the mercury removal powder with the dry flue gas circulating inside the pulverized coal supply line L3, the mercury removal efficiency of the mercury removal system 270 may be improved.

Tenth Embodiment

Figure 12:
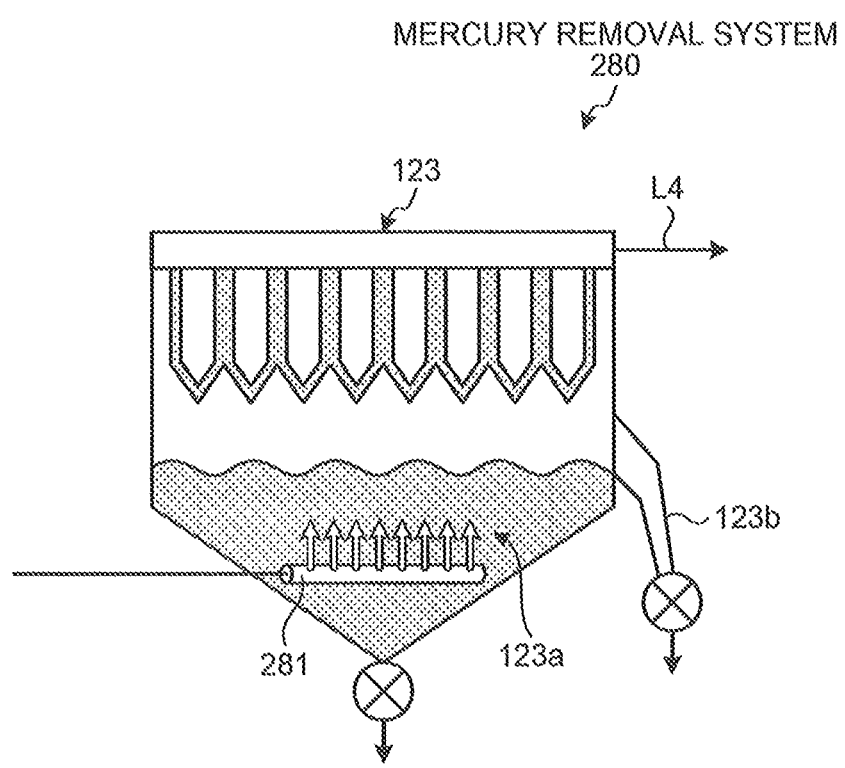
FIG. 12 is a schematic configuration diagram schematically illustrating the peripheral configuration of a pulverized coal dust collector of a mercury removal system according to a tenth embodiment.

Next, a mercury removal system 280 according to a tenth embodiment will be described with reference to FIG. 12. FIG. 12 is a schematic configuration diagram schematically illustrating the peripheral configuration of a pulverized coal dust collector of a mercury removal system according to the tenth embodiment. Furthermore, also in the tenth embodiment, a difference from the first to ninth embodiments will be described so as to prevent the repetitive description, and the same reference numerals will be given to the same components as the first to ninth embodiments. The mercury removal system 280 according to the tenth embodiment has a configuration in which the mercury removal powder is supplied into the pulverized coal dust collector 123. Hereinafter, the mercury removal system 280 according to the tenth embodiment will be described.

As illustrated in FIG. 12, the pulverized coal dust collector 123 is formed as a bag filter, and includes therein a storage portion 123a which stores the pulverized coal and the mercury removal powder subjected to the dust collection process. Further, the pulverized coal dust collector 123 is provided with an overflow tube 123b, and the pulverized coal and the mercury removal powder which overflow from the storage portion 123a are discharged to the outside of the pulverized coal dust collector 123 (for example, the pulverized coal supply facility 112).

The mercury removal system 280 according to the tenth embodiment further includes a diffuser tube 281 which is provided inside the storage portion 123a of the pulverized coal dust collector 123. The diffuser tube 281 supplies the dry flue gas to the storage portion 123a of the pulverized coal dust collector 123. Since the mercury removal powder and the pulverized coal remaining in the dry flue gas are carried through the air stream using the dry flue gas, a mixture gas obtained by mixing the pulverized coal and the mercury removal powder with each other is supplied to the storage portion 123a of the pulverized coal dust collector 123.

As described above, according to the configuration of the tenth embodiment, the gasified mercury may be removed in a manner such that the gasified mercury in the dry flue gas contacts the mercury removal powder by fluidizing the pulverized coal and the mercury removal powder stored in the storage portion 123a of the pulverized coal dust collector 123 using the dry flue gas. For this reason, it is possible to decrease the amount of the gasified mercury in the dry flue gas discharged from the pulverized coal dust collector 123.

Furthermore, the mercury removal systems 1, 200, 210, 220, 230, 240, 250, 260, 270, and 280 of the first to tenth embodiments may be appropriately combined with one another.

Eleventh Embodiment

Figure 13:
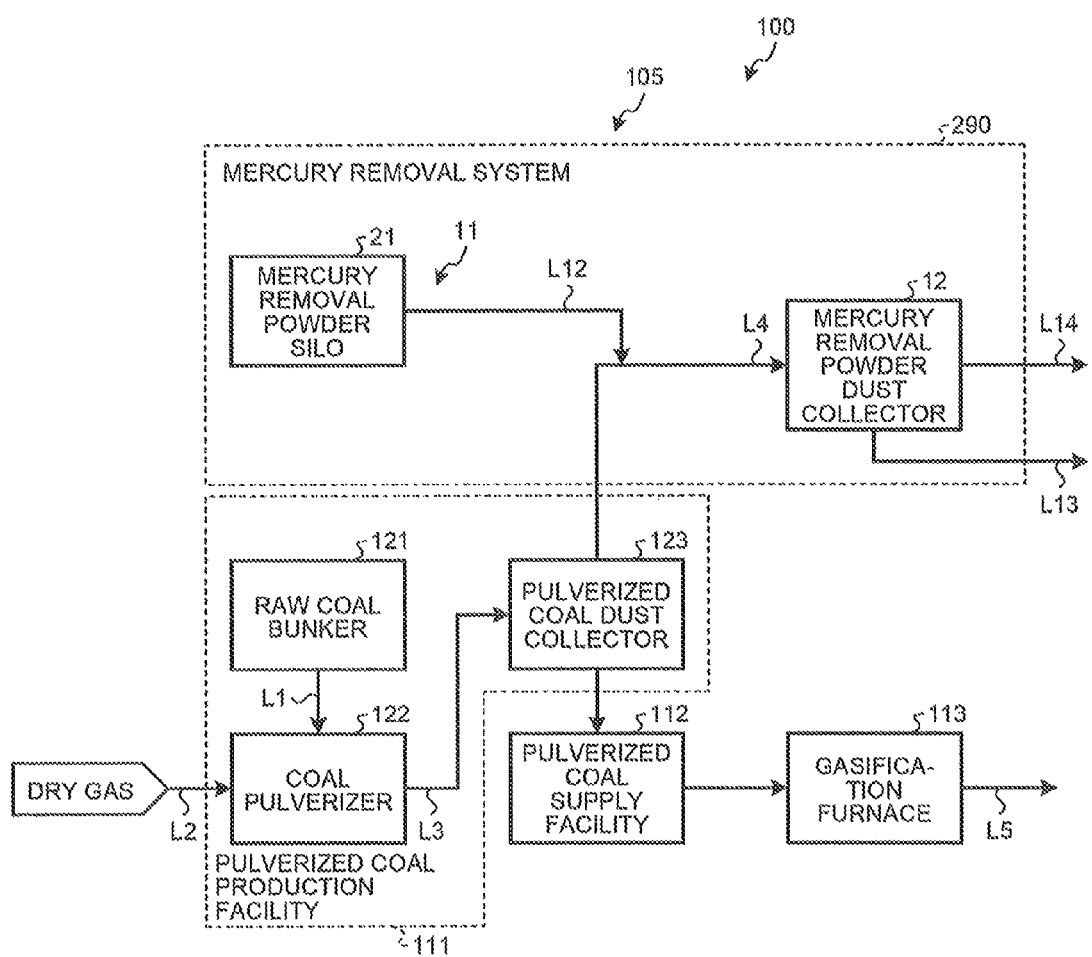
FIG. 13 is a schematic configuration diagram schematically illustrating the configuration of a mercury removal system according to an eleventh embodiment.

Next, a mercury removal system 290 which is provided in the gasification system 105 of the coal gasification combined power generation system 100 according to an eleventh embodiment will be described in detail with reference to FIG. 13. FIG. 13 is a schematic configuration diagram schematically illustrating the configuration of a mercury removal system according to the eleventh embodiment. The mercury removal system 290 is used to remove the gasified mercury contained in the dry flue gas generated by drying and pulverizing the raw coal in the coal pulverizer 122.

As illustrated in FIG. 13, the mercury removal system 290 is provided around the pulverized coal production facility ill. The mercury removal system 290 includes the powder supply device (the removal agent supply device of the first to tenth embodiments) 11 which supplies the mercury removal powder and a mercury removal powder dust collector 12 which collects the dust of the mercury removal powder supplied thereto. The powder supply device 11 supplies the mercury removal powder to the gas discharge line L4 in which the dry flue gas discharged from the pulverized coal dust collector 123 circulates.

Here, as the mercury removal powder, for example, activated coal, chloride such as calcium chloride, or char as an unreacted element of the powder raw material generated by the production of the gasified gas is used, and becomes powder capable of absorbing the mercury.

Similarly to the first to tenth embodiments, the powder supply device 11 includes the mercury removal powder silo (the storage tank) 21 which stores the mercury removal powder and the powder supply line L12 which connects the mercury removal powder silo 21 to the gas discharge line L4. Further, the powder supply device 11 carries the mercury removal powder stored in the mercury removal powder silo 21 through the air stream by circulating a carrying medium (nitrogen, air, or the like) in the powder supply line L12. Then, the powder supply device 11 supplies the mercury removal powder which is carried in the powder supply line L12 through the air stream to the gas discharge line L4.

The mercury removal powder dust collector 12 is formed as, for example, a bag filter, and collects the dust of the mercury removal powder supplied to the gas discharge line L4. The mercury removal powder dust collector 12 separates the mercury removal powder and the dry flue gas from each other by collecting the dust of the mercury removal powder. The powder discharge line L13 which discharges the mercury removal powder and the pure gas discharge line L14 which discharges the pure gas are connected to the mercury removal powder dust collector 12. The mercury removal powder dust collector 12 discharges the mercury removal powder from the powder discharge line L13 when the amount of the separated mercury removal powder becomes a predetermined amount or more. Further, the mercury removal powder dust collector 12 discharges the dry flue gas, which is separated by collecting the dust of the mercury removal powder, as the pure gas from the pure gas discharge line L14. Furthermore, the pure gas discharge line L14 may be connected to the stack 106 or may be opened to the atmosphere.

Here, the length of the gas discharge line L4 from the connection portion between the powder supply line L12 and the gas discharge line L4 to the mercury removal powder dust collector 12 is set to a length capable of ensuring a predetermined contact time in which the mercury removal powder may absorb the gasified mercury contained in the dry flue gas. That is, the length of the gas discharge line L4 between the connection portion and the mercury removal powder dust collector 12 becomes a length which is obtained by multiplying the flow rate of the dry flue gas of the gas discharge line L4 by the predetermined contact time, and the predetermined contact time becomes, for example, 1.5 seconds or more (desirably, 2.5 seconds or more).

In such a mercury removal system 290, when the mercury removal powder supplied from the mercury removal powder silo 21 is carried by the carrying medium circulating in the powder supply line L12 through the air stream, the mercury removal powder which is carried through the air stream is supplied to the gas discharge line L4 through the powder supply line L12. The mercury removal powder which is supplied to the gas discharge line L4 is mixed with the dry flue gas circulating in the gas discharge line L4 (a powder mixing step). At this time, the gasified mercury contained in the dry flue gas is absorbed to the mercury removal powder while contacting the mercury removal powder mixed with the dry flue gas.

Then, the mercury removal powder absorbing the mercury flows from the gas discharge line L4 into the mercury removal powder dust collector 12 along with the dry flue gas. The mercury removal powder which flows into the mercury removal powder dust collector 12 is separated into the mercury removal powder and the dry flue gas. Here, the separated mercury removal powder is discharged from the powder discharge line L13, and the separated dry flue gas is discharged from the pure gas discharge line L14 (a dust collecting step).

As described above, according to the configuration of the eleventh embodiment, since the powder supply device 11 may supply the mercury removal powder to the gas discharge line L4 in which the dry flue gas circulates, it is possible to remove the gasified mercury which is contained in the dry flue gas generated by the pulverization of the raw coal by using the mercury removal powder. Further, the mercury removal powder which is supplied to the dry flue gas is subjected to the dust collection process by the mercury removal powder dust collector 12, and the dry flue gas from which the mercury is removed may be discharged as the pure gas from the mercury removal powder dust collector 12. Accordingly, since the gasified mercury in the dry flue gas discharged from the pulverized coal dust collector 123 is removed and the gas may be discharged as the pure gas from the mercury removal powder dust collector 12, it is possible to improve the environmental performance in the coal gasification combined power generation system 100 including the gasification system 105.

Twelfth Embodiment

Next, a mercury removal system 300 according to a twelfth embodiment will be described with reference to FIG.

Figure 14:
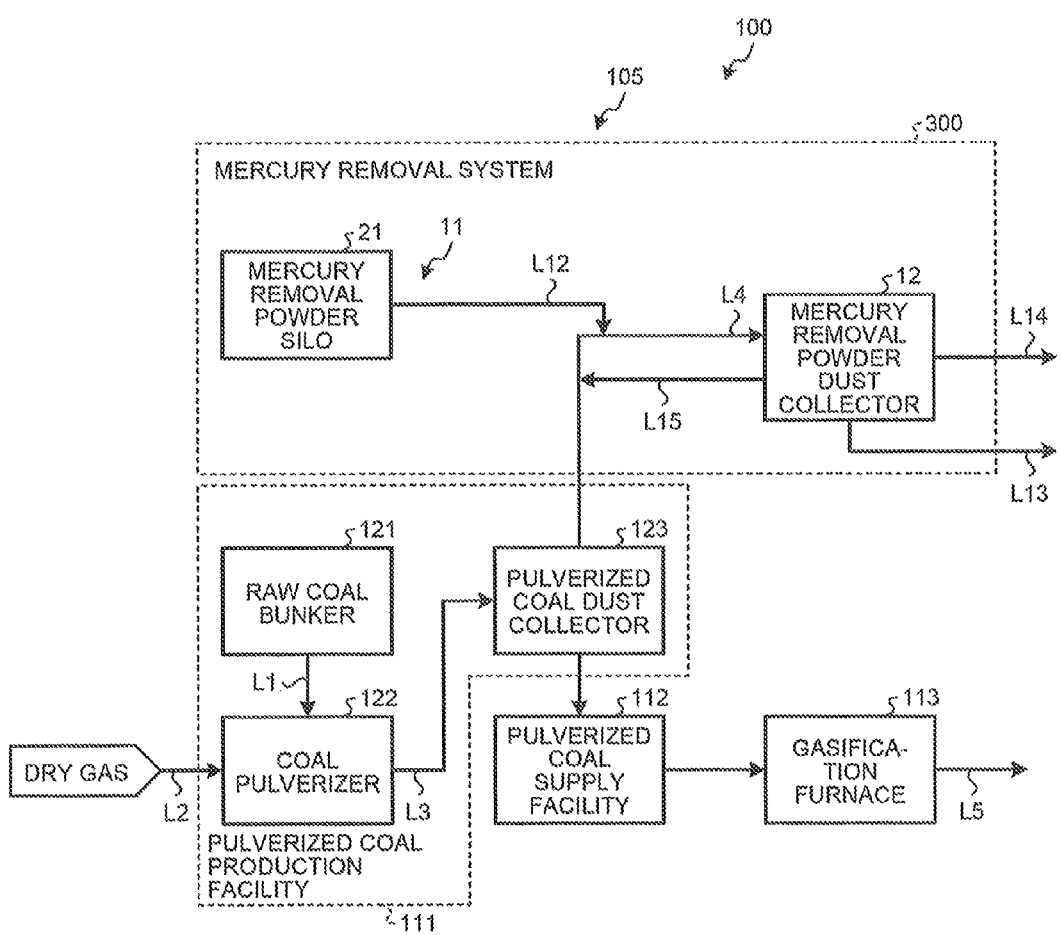
FIG. 14 is a schematic configuration diagram schematically illustrating the configuration of a mercury removal system according to a twelfth embodiment.

14. FIG. 14 is a schematic configuration diagram schematically illustrating the configuration of a mercury removal system according to the twelfth embodiment. Furthermore, in the twelfth embodiment, a difference from the eleventh embodiment will be described so as to prevent the repetitive description, and the same reference numerals will be given to the same components as the eleventh embodiment. The mercury removal system 300 according to the twelfth embodiment has a configuration in which a first recirculation line L15 is additionally provided so as to recirculate the mercury removal powder subjected to the dust collection process by the mercury removal powder dust collector 12 in the mercury removal system 290 of the eleventh embodiment to the gas discharge line L4. Hereinafter, the mercury removal system 300 according to the twelfth embodiment will be described.

As illustrated in FIG. 14, the mercury removal system 300 according to the second embodiment further includes a first recirculation line L15 which connects the mercury removal powder dust collector 12 to the gas discharge line L4 in addition to the configuration of the mercury removal system 290 of the eleventh embodiment. The first recirculation line L15 supplies the mercury removal powder subjected to the dust collection process by the mercury removal powder dust collector 12 to the gas discharge line L4. Similarly to the powder supply line L12, the first recirculation line L15 circulates a carrying medium (air, nitrogen, or the like) therein, and carries the mercury removal powder subjected to the dust collection process by the mercury removal powder dust collector 12 through the air stream.

Here, the first recirculation line L15 is connected to the upstream gas discharge line L4 in relation to the connection portion between the powder supply line L12 and the gas discharge line L4 in the gas flow direction of the dry flue gas of the gas discharge line L4. For this reason, the mercury removal powder which is subjected to the dust collection process by the mercury removal powder dust collector 12 is first supplied from the first recirculation line L15 to the gas discharge line L4, and then fresh mercury removal powder which is not used yet is supplied from the powder supply line L12 to the gas discharge line.

As described above, according to the configuration of the twelfth embodiment, the mercury removal powder which is subjected to the dust collection process by the mercury removal powder dust collector 12 may be supplied to the gas discharge line L4. For this reason, since the mercury removal powder still having the mercury removal ability may be used again, the amount of the (fresh) mercury removal powder supplied from the powder supply device 11 may be decreased. Further, since the mercury removal powder (having a mercury removal ability lower than the fresh mercury removal powder) from the first recirculation line L15 may be supplied to the upstream portion having a gasified mercury concentration higher than the gasified mercury contained in the dry flue gas circulating in the gas discharge line L4 and fresh mercury removal powder (having a high mercury removal ability) may be supplied from the powder supply line L12 to the downstream portion having a low gasified mercury concentration, the mercury removal efficiency of the mercury removal system 300 may be improved.

Thirteenth Embodiment

Figure 15:
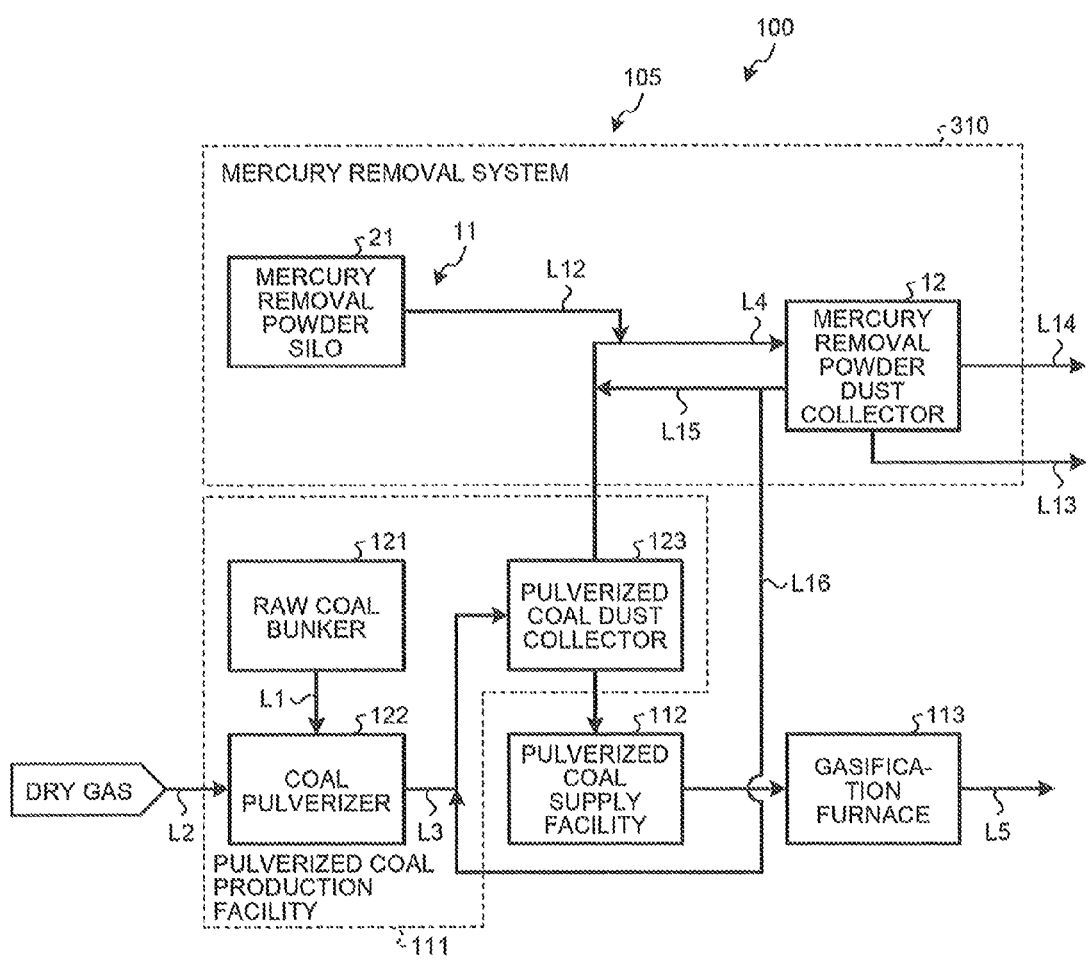
FIG. 15 is a schematic configuration diagram schematically illustrating the configuration of a mercury removal system according to a thirteenth embodiment.

Next, a mercury removal system 310 according to a thirteenth embodiment will be described with reference to FIG. 15. FIG. 15 is a schematic configuration diagram schematically illustrating the configuration of a mercury removal system according to the thirteenth embodiment. Furthermore, also in the thirteenth embodiment, a difference from the eleventh and twelfth embodiments will be described so as to prevent the repetitive description, and the same reference numerals will be given to the same components as the eleventh and twelfth embodiments. The mercury removal system 310 according to the thirteenth embodiment has a configuration in which a second recirculation line L16 is additionally provided so as to recirculate the mercury removal powder subjected to the dust collection process by the mercury removal powder dust collector 12 in the mercury removal system 300 of the twelfth embodiment to the pulverized coal supply line L3. Hereinafter, the mercury removal system 310 according to the thirteenth embodiment will be described.

As illustrated in FIG. 15, the mercury removal system 310 according to the thirteenth embodiment further includes a second recirculation line L16 which connects the mercury removal powder dust collector 12 to the pulverized coal supply line L3 in addition to the configuration of the mercury removal system 300 of the twelfth embodiment. The second recirculation line L16 supplies the mercury removal powder which is subjected to the dust collection process by the mercury removal powder dust collector 12 to the pulverized coal supply line L3. Similarly to the powder supply line L12, the second recirculation line L16 circulates a carrying medium (air, nitrogen, or the like) therein, and carries the mercury removal powder which is subjected to the dust collection process by the mercury removal powder dust collector 12 through the air stream. Further, the second recirculation line L16 is branched from the first recirculation line L15 and is connected to the pulverized coal supply line L3. Furthermore, the second recirculation line L16 may be an independent line which is separated from the first recirculation line L15.

Here, the mercury removal powder which is supplied from the second recirculation line L16 to the pulverized coal supply line L3 is mixed with the pulverized coal and the dry flue gas circulating in the pulverized coal supply line L3. At this time, the gasified mercury contained in the dry flue gas is absorbed to the mercury removal powder while contacting the mercury removal powder mixed with the dry flue gas.

Then, the mercury removal powder absorbing the mercury flows from the pulverized coal supply line L3 into the pulverized coal dust collector 123 along with the pulverized coal and the dry flue gas. The mercury removal powder which flows into the pulverized coal dust collector 123 is separated into the pulverized coal, the mercury removal powder, and the dry flue gas. Here, the pulverized coal and the mercury removal powder which are separated as described above are supplied to the gasification furnace 113 by the pulverized coal supply facility 112, and the separated dry flue gas is discharged from the gas discharge line L4. Furthermore, the mercury removal powder to which the mercury is absorbed and which is supplied to the gasification furnace 113 becomes ash and a gas under a hot and dry condition inside the gasification furnace 113. The ash in the mercury removal powder is discharged along with the ash in the coal. Meanwhile, hydrocarbon in the mercury removal powder is gasified so as to become carbon monoxide or hydrogen, and the mercury absorbed to the mercury removal powder becomes gasified mercury, is mixed with produced gas, and flows into the gas purification device 115 so as to be treated in the gas purification device 115.

As described above, according to the configuration of the thirteenth embodiment, the mercury removal powder which is subjected to the dust collection process by the mercury removal powder dust collector 12 may be supplied to the pulverized coal supply line L3. For this reason, since the contact time between the gasified mercury and the mercury removal powder still having a mercury removal, ability is long and the mercury removal powder may be used again in a portion having a high concentration of the mercury in the dry flue gas, the amount of the mercury removal powder supplied from the powder supply device 11 may be further decreased. Further, since the gasified mercury in the dry flue gas of the pulverized coal supply line L3 may be removed and the gasified mercury in the dry flue gas of the gas discharge line L4 may be removed, the mercury removal efficiency of the mercury removal system 310 may be improved.

Furthermore, in the thirteenth embodiment, since the mercury removal powder may be treated after the gasification furnace 113 by supplying the mercury removal powder to the pulverized coal supply line L3, the mercury removal system 310 of the thirteenth embodiment may not include the powder discharge line L13.

Fourteenth Embodiment

Figure 16:
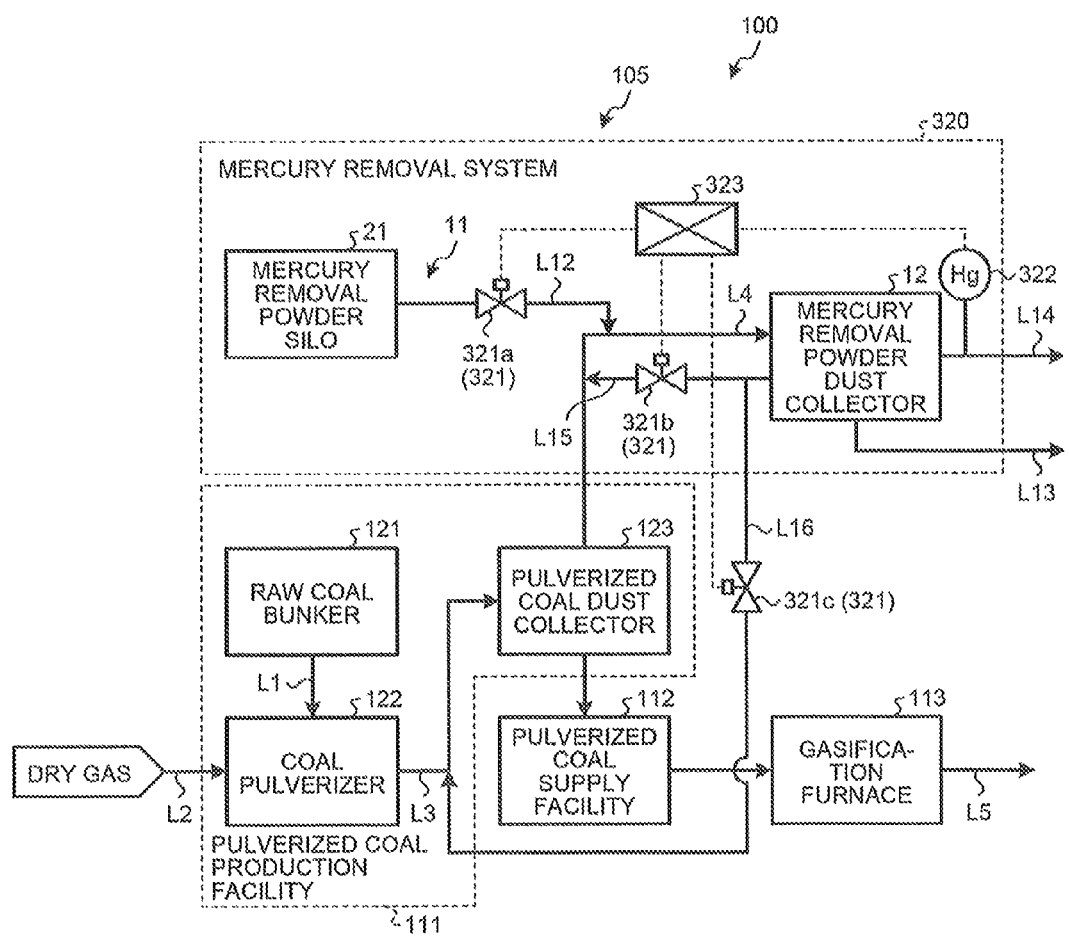
FIG. 16 is a schematic configuration diagram schematically illustrating the configuration of a mercury removal system according to a fourteenth embodiment.

Next, a mercury removal system 320 according to a fourteenth embodiment will be described with reference to FIG. 16. FIG. 16 is a schematic configuration diagram schematically illustrating the configuration of a mercury removal system according to the fourteenth embodiment. Furthermore, also in the fourteenth embodiment, a difference from the eleventh to thirteenth embodiments will be described so as to prevent the repetitive description, and the same reference numerals will be given to the same components as the eleventh to thirteenth embodiments. The mercury removal system 320 according to the fourteenth embodiment has a configuration in which a mercury system 322 is provided in the pure gas discharge line L14 of the mercury removal system 310 of the thirteenth embodiment and the mercury removal powder supply amount is adjusted based on the detection result of the mercury system 322. Hereinafter, the mercury removal system 320 according to the fourteenth embodiment will be described.

As illustrated in FIG. 16, the mercury removal system 320 according to the fourteenth embodiment further includes a plurality of flow rate adjustment valves 321, the mercury system 322, and a control unit 323 in addition to the configuration of the mercury removal system 310 of the thirteenth embodiment.

In the fourteenth embodiment, the number of flow rate adjustment valves 321 is, for example, three, and the plurality of flow rate adjustment valves include a flow rate adjustment valve 321a which is provided in the powder supply line L12, a flow rate adjustment valve 321b which is provided in the first recirculation line L15, and a flow rate adjustment valve 321c which is provided in the second recirculation line L16. These three flow rate adjustment valves 321a, 321b, and 321c are connected to the control unit 323. Then, when the control unit 323 controls the opening degrees of the flow rate adjustment valves 321a, 321b, and 321c, the amount of the mercury removal powder supplied from the powder supply line L12 to the gas discharge line L4, the amount of the mercury removal powder supplied from the first recirculation line L15 to the gas discharge line L4, and the amount of the mercury removal powder supplied from the second recirculation line L16 to the pulverized coal supply line L3 are adjusted.

The mercury system 322 detects the residual mercury concentration in the pure gas circulating in the pure gas discharge line L14. The mercury system 322 is connected to the control unit 323, and outputs the detection result to the control unit 323.

The control unit 323 appropriately controls three flow rate adjustment valves 321a, 321b, and 321c based on the detection result of the mercury system 322. Specifically, the control unit 323 increases at least one opening degree of three flow rate adjustment valves 321a, 321b, and 321c when the residual mercury concentration detected by the mercury system 322 is larger than a predetermined residual mercury concentration. For this reason, the control unit 323 increases the amount of the mercury removal powder supplied to the gas discharge line L4 or the pulverized coal supply line L3. Meanwhile, the control unit 323 decreases at least one opening degree of three flow rate adjustment valves 321a, 321b, and 321c when the residual mercury concentration detected by the mercury system 322 is smaller than a predetermined residual mercury concentration. For this reason, the control unit 323 decreases the amount of the mercury removal powder supplied to the gas discharge line L4 or the pulverized coal supply line L3.

As described above, according to the configuration of the fourteenth embodiment, since the control unit 323 may control the mercury removal powder supply amount in response to the residual mercury concentration in the pure gas, the mercury removal powder may be used with high efficiency.

Furthermore, in the fourteenth embodiment, the flow rate adjustment valves 321 are provided in each of the powder supply line L12, the first recirculation line L15, and the second recirculation line L16, but may be provided only in one line. That is, the control unit 323 may be used as long as adjustable the amount of the mercury removal powder supplied to at least one of the powder supply line L12, the first recirculation line L15, and the second recirculation line L16.

Fifteenth Embodiment

Figure 17:
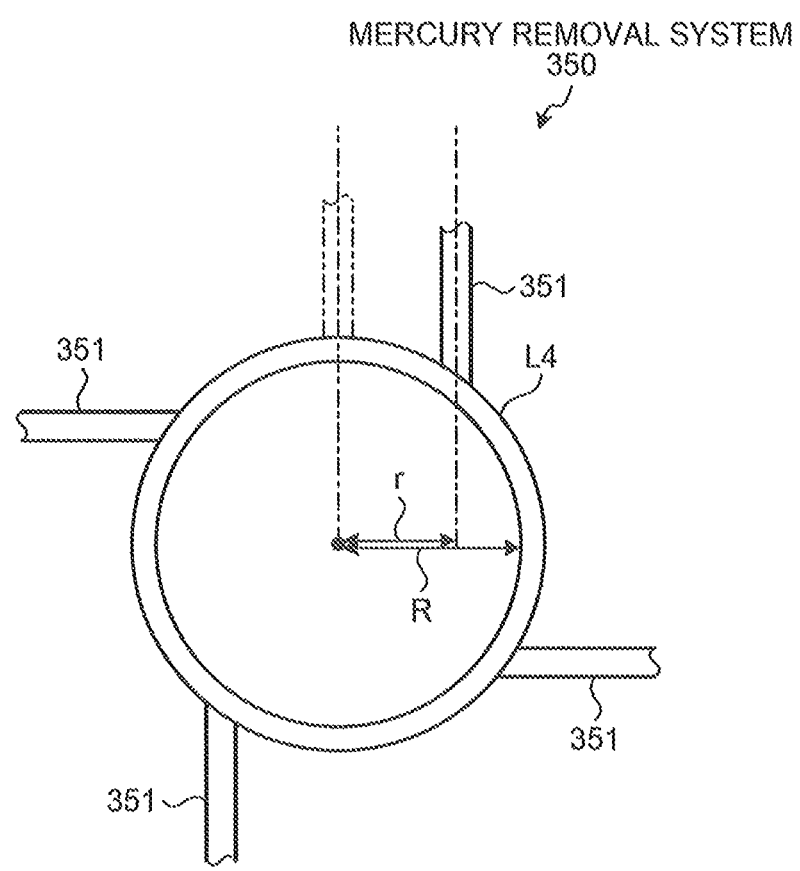
FIG. 17 is a cross-sectional view schematically illustrating the peripheral configuration of a gas discharge line of a mercury removal system according to a fifteenth embodiment.
Figure 18:
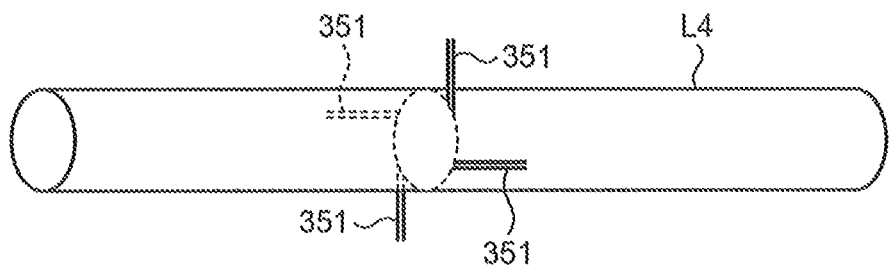
FIG. 18 is an explanatory diagram schematically illustrating the peripheral configuration of the gas discharge line of the mercury removal system according to the fifteenth embodiment.

Next, a mercury removal system 350 according to a fifteenth embodiment will be described with reference to FIGS. 17 and 18. FIG. 17 is a cross-sectional view schematically illustrating the peripheral configuration of a gas discharge line of a mercury removal system according to the fifteenth embodiment, and FIG. 18 is an explanatory diagram schematically illustrating the peripheral configuration of the gas discharge line of the mercury removal system according to the fifteenth embodiment. Furthermore, also in the fifteenth embodiment, a difference from the eleventh to fourteenth embodiments will be described so as to prevent the repetitive description, and the same reference numerals will be given to the same components as the eleventh to fourteenth embodiments. The mercury removal system 350 according to the fifteenth embodiment has a configuration in which the mercury removal powder is injected from the plurality of supply nozzles 251 to the gas discharge line L4 of the eleventh to fourteenth embodiments. Hereinafter, the mercury removal system 250 according to the fifteenth embodiment will be described.

As illustrated in FIG. 17, the mercury removal system 350 according to the fifteenth embodiment further includes a plurality of supply nozzles 351 which are provided in the gas discharge line L4 in addition to the configurations of the mercury removal systems 290, 300, 310, and 320 of the eleventh to fourteenth embodiments. At this time, the gas discharge line L4 is formed as a cylindrical tube. Furthermore, the mercury removal powder may be supplied from the powder supply line L12 to the plurality of supply nozzles 351, and the mercury removal powder may be supplied from the first recirculation line L15. Further, in the fifteenth embodiment, the plurality of supply nozzles 351 are provided in the gas discharge line L4, but may be provided in the pulverized coal supply line L3. In this case, the mercury removal powder may be supplied from the second recirculation line L16.

The plurality of supply nozzles 351 are provided at a predetermined interval in the circumferential direction of the gas discharge line L4 in the cross-section (the tube cross-section) taken along the plane perpendicular to the tube axis direction of the gas discharge line L4 as the cylindrical tube. For this reason, the plurality of supply nozzles 351 are provided along the tube wall in the tube cross-section. Further, as illustrated in FIG. 18, the plurality of supply nozzles 351 are provided at the same position in the tube axis direction of the gas discharge line L4. The plurality of supply nozzles 351 are disposed so that the mercury removal powder supplied to the gas discharge line L4 are ejected from the wall surface of the gas discharge line L4. Specifically, the plurality of supply nozzles 351 are disposed as illustrated in FIG. 17.

Here, each supply nozzle 351 is formed as a cylindrical tube. In the cross-section illustrated in FIG. 17, a predetermined radius of the gas discharge line L4 is indicated by R. Further, each supply nozzle 351 is disposed so that the tube axis direction thereof is perpendicular to the predetermined radial direction (on the radius R) of the gas discharge line L4. At this time, the distance from the center of the gas discharge line L4 on the radius R to each supply nozzle 351 perpendicular to the predetermined radial direction is indicated by r. That is, the distance r becomes the distance between the center of the cylindrical tube and the extension line of the axis direction of each supply nozzle 351. In this case, each supply nozzle 351 is disposed in the range of "$0 \leq r \leq \frac{2}{3}R$".

Since the plurality of supply nozzles 351 are disposed as illustrated in FIG. 17, the mercury removal powder injected from each supply nozzle 351 may supply the dry flue gas circulating in the gas discharge line L4 to the area center position of the gas discharge line L4.

As described above, according to the configuration of the fifteenth embodiment, the plurality of supply nozzles 351 may supply the mercury removal powder to the dry flue gas circulating in the gas discharge line L4 so that the mercury removal powder can be supplied to the area center position of the gas discharge line L4, and may rapidly mix the mercury removal powder with the dry flue gas. As a result, since the mercury removal powder may be supplied while being rapidly and uniformly dispersed in the gas discharge line L4, the contact time between the gasified mercury in the dry flue gas and the mercury removal powder may be lengthened, and the mercury removal efficiency of the mercury removal system 350 may be improved.

Furthermore, in the fifteenth embodiment, the plurality of supply nozzles 351 are provided in the gas discharge line L4, but a single supply nozzle 351 may be provided in the gas discharge line L4.

Sixteenth Embodiment

Figure 19:
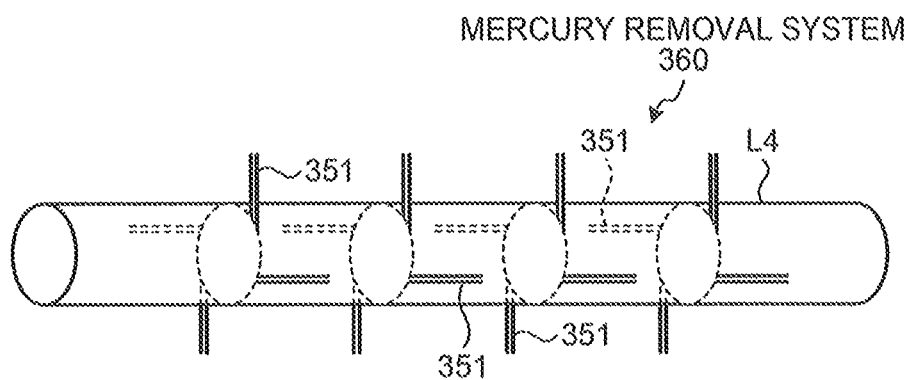
FIG. 19 is an explanatory diagram schematically illustrating the peripheral configuration of a gas discharge line of a mercury removal system according to a sixteenth embodiment.

Next, a mercury removal system 360 according to a sixteenth embodiment will be described with reference to FIG. 19. FIG. 19 is an explanatory diagram schematically illustrating the peripheral configuration of a gas discharge line of a mercury removal system according to the sixteenth embodiment. Furthermore, also in the sixteenth embodiment, a difference from the eleventh to fifteenth embodiments will be described so as to prevent the repetitive description, and the same reference numerals will be given to the same components as the eleventh to fifteenth embodiments. The mercury removal system 360 according to the sixteenth embodiment has a configuration in which the plurality of supply nozzles 351 of the mercury removal system 350 of the fifteenth embodiment are disposed in a different way. Hereinafter, the mercury removal system 360 according to the sixteenth embodiment will be described.

As illustrated in FIG. 19, the mercury removal system 360 according to the sixteenth embodiment has a configuration in which the plurality of supply nozzles 351 of the mercury removal system 350 of the fifteenth embodiment are disposed at a predetermined interval in the tube axis direction of the gas discharge line L4.

As described above, according to the configuration of the sixteenth embodiment, the plurality of supply nozzles 351 may uniformly supply the mercury removal powder from the center of the gas flow inside the gas discharge line L4 in the circulation direction of the gas discharge line L4 to the outer peripheral portion thereof, and hence the mercury removal powder having a high absorption ability may further repeatedly contact the dry flue gas. Accordingly, the contact time between the mercury in the dry flue gas and the mercury removal powder may be lengthened, and the mercury removal powder having a high absorption ability may be supplied to an area having a low mercury (Hg) concentration for the purpose of the contact. As a result, the mercury removal efficiency of the mercury removal system 360 may be improved.

Seventeenth Embodiment

Figure 20:
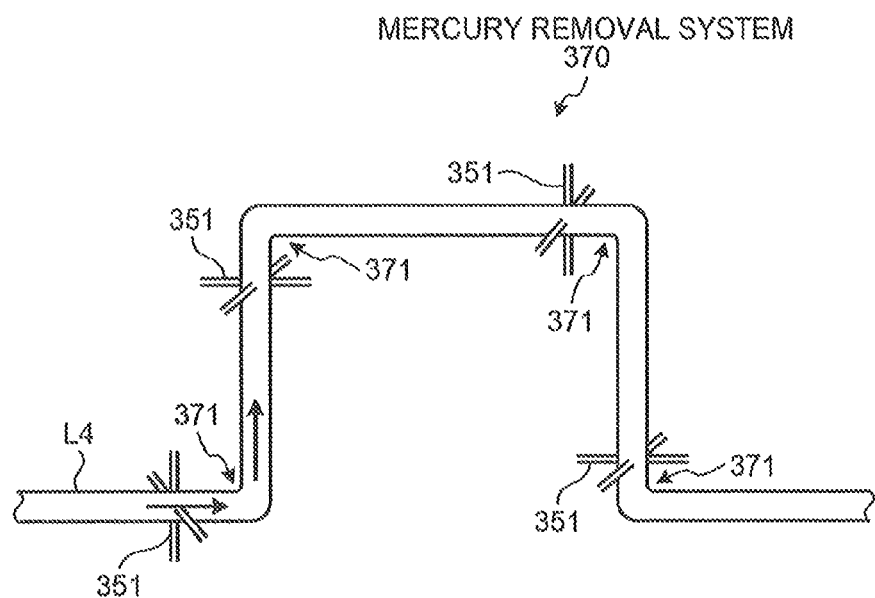
FIG. 20 is an explanatory diagram schematically illustrating the peripheral configuration of a gas discharge line of a mercury removal system according to a seventeenth embodiment.

Next, a mercury removal system 370 according to a seventeenth embodiment will be described with reference to FIG. 20. FIG. 20 is an explanatory diagram schematically illustrating the peripheral configuration of a gas discharge line of a mercury removal system according to the seventeenth embodiment. Furthermore, also in the seventeenth embodiment, a difference from the eleventh to sixteenth embodiments will be described so as to prevent the repetitive description, and the same reference numerals will be given to the same components as the eleventh to sixteenth embodiments. The mercury removal system 370 according to the seventeenth embodiment has a configuration in which a curved portion 371 is provided in the gas discharge line L4. Hereinafter, the mercury removal system 370 according to the seventeenth embodiment will be described.

As illustrated in FIG. 20, in the mercury removal system 370 according to the seventeenth embodiment, the gas discharge line L4 is provided with at least one curved portion 371, and the curved portion 371 is provided with the plurality of supply nozzles 351 of the fifteenth embodiment and the sixteenth embodiment. At least one supply nozzle 351 of the plurality of supply nozzles 351 is provided in the vicinity of the upstream entrance of the curved portion 371 in the gas discharge line L4.

For example, four curved portions 371 are provided in the gas discharge line L4. The supply nozzle 351 which is provided in each curved portion 371 is disposed at the upstream side of the curved portion 371.

As described above, according to the configuration of the seventeenth embodiment, since it is possible to promote the operation of mixing the mercury removal powder with the dry flue gas circulating in the gas discharge line L4, the mercury removal efficiency of the mercury removal system 370 may be improved.

Eighteenth Embodiment

Figure 21:
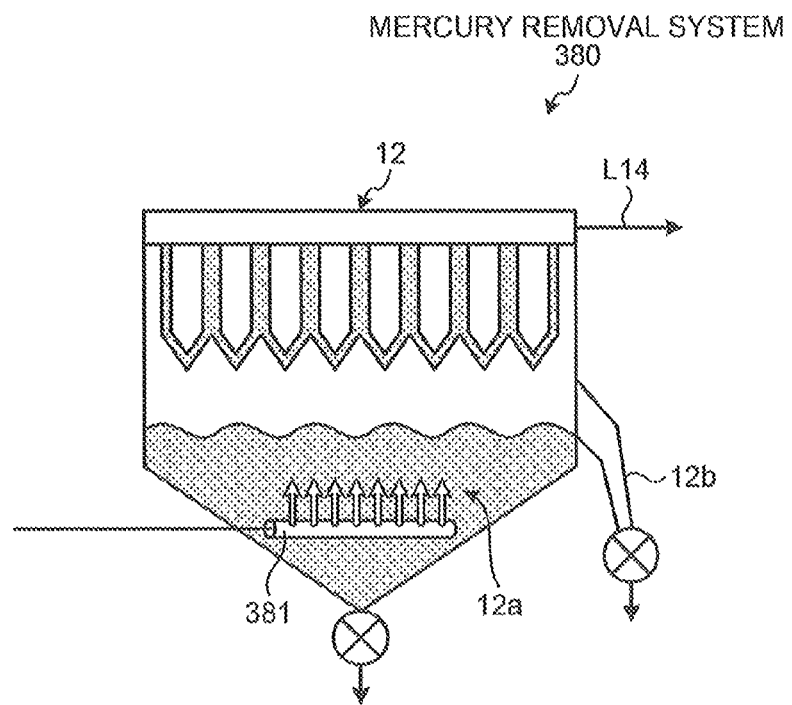
FIG. 21 is a schematic configuration diagram schematically illustrating the peripheral configuration of a mercury removal powder dust collector of a mercury removal system according to an eighteenth embodiment.

Next, a mercury removal system 380 according to an eighteenth embodiment will be described with reference to FIG. 21. FIG. 21 is a schematic configuration diagram schematically illustrating the peripheral configuration of a mercury removal powder dust collector of a mercury removal system according to the eighteenth embodiment. Furthermore, also in the eighteenth embodiment, a difference from the eleventh to seventeenth embodiments will be described so as to prevent the repetitive description, and the same reference numerals will be given to the same components as the eleventh to seventeenth embodiments. The mercury removal system 380 according to the eighteenth embodiment has a configuration in which the mercury removal powder is supplied into a mercury removal powder dust collector 12. Hereinafter, the mercury removal system 380 according to the eighteenth embodiment will be described.

As illustrated in FIG. 21, the mercury removal powder dust collector 12 is formed as a bag filter, and includes therein a storage portion 12a which stores the mercury removal powder from which the dust is collected. Further, the mercury removal powder dust collector 12 is provided with an overflow tube 12b, and discharges the mercury removal powder overflowing from the storage portion 12a to the outside of the mercury removal powder dust collector 12 (for example, the powder discharge line L13).

The mercury removal system 380 according to the eighteenth embodiment further includes a diffuser tube 381 which is provided in the storage portion 12a of the mercury removal powder dust collector 12. The diffuser tube 381 supplies the dry flue gas containing the mercury removal powder from the gas discharge line L4 to the storage portion 12a of the mercury removal powder dust collector 12. By using the dry flue gas, the gasified mercury remaining in the dry flue gas may contact the mercury removal powder fluidized in the storage portion 12a of the mercury removal powder dust collector 12, and hence the mercury may be removed. For this reason, it is possible to decrease the amount of the gasified mercury in the dry flue gas discharged from the mercury removal powder dust collector 12.

As described above, according to the configuration of the eighteenth embodiment, it is possible to remove the mercury by causing the gasified mercury to contact the fluidized mercury removal powder in a manner such that the mercury removal powder stored in the storage portion 12a of the mercury removal powder dust collector 12 is fluidized by the dry flue gas containing the gasified mercury. For this reason, it is possible to decrease the amount of the gasified mercury in the dry gas discharged from the mercury removal powder dust collector 12.

Furthermore, the mercury removal systems 290, 300, 310, 320, 350, 360, 370, and 380 of the eleventh to eighteenth embodiments may be appropriately combined with one another.

First Modified Example

A gasification combined power generation system according to a first modified example includes: a pulverizing machine which pulverizes a hydrocarbon raw material into a powder raw material; a powder dust collector which collects the dust from the powder raw material discharged from the pulverizing machine along with a dry gas supplied to the pulverizing machine so as to be separated into the powder raw material and a dry flue gas discharged when the hydrocarbon raw material is pulverized; a gasification system which includes a gasification furnace gasifying the powder raw material separated by the powder dust collector; a mercury removal system which is provided in the gasification system; a gas turbine which is operated by using a gasified gas gasified by the gasification system as a fuel; a steam turbine which is operated by vapor generated by an exhaust heat recovery boiler introducing a combustion flue gas from the gas turbine; and a generator which is connected to the gas turbine and the steam turbine.

According to the configuration of the first modified example, since the gasification combined power generation system may be provided with the mercury removal system, it is possible to remove the gasified mercury in the dry flue gas discharged when the hydrocarbon raw material is pulverized by the use of the mercury removal agent. For this reason, the pure gas from which the mercury is removed may be discharged from the powder dust collector. Accordingly, since the pure gas may be discharged from the powder dust collector and the mercury in the dry flue gas discharged when the hydrocarbon raw material is pulverized may be removed by the mercury removal device, the environmental performance may be improved.

The mercury removal method of the invention is a mercury removal method of pulverizing a hydrocarbon raw material, drying the hydrocarbon raw material by a dry gas, and removing mercury in a dry flue gas discharged when the hydrocarbon raw material becomes a powder raw material, the mercury removal method including: mixing a mercury removal agent removing the mercury with the dry flue gas; and collecting the dust of the mercury removal agent mixed with the dry flue gas along with the powder raw material.

According to this configuration, it is possible to remove the mercury in the dry flue gas discharged when the hydrocarbon raw material is pulverized by the mercury removal agent and to collect the powder raw material along with the mercury removal agent containing the mercury through the dust collection process. Accordingly, since it is possible to remove the mercury in the dry flue gas discharged when the hydrocarbon raw material is pulverized, the environmental performance may be improved.

REFERENCE SIGNS LIST

1 Mercury removal system
11 Removal agent supply device (powder supply device)
21 Mercury removal powder silo
100 Coal gasification combined power generation system
105 Gasification system
106 Stack
111 Pulverized coal production facility (powder supply system)
112 Pulverized coal supply facility
113 Gasification furnace
114 Char recovery device
115 Gas purification device
117 Gas turbine facility
118 Steam turbine facility
120 Exhaust heat recovery boiler
121 Raw coal bunker
122 Coal pulverizer (pulverizing machine)
123 Pulverized coal dust collector (powder dust collector)

200 Mercury removal system (second embodiment)
210 Mercury removal system (third embodiment)
220 Mercury removal system (fourth embodiment)
230 Mercury removal system (fifth embodiment)
240 Mercury removal system (sixth embodiment)
241 Solid-gas separator
242 First supply nozzle
243 Second supply nozzle
250 Mercury removal system (seventh embodiment)
251 Supply nozzle
260 Mercury removal system (eighth embodiment)
270 Mercury removal system (ninth embodiment)
271 Curved portion
280 Mercury removal system (tenth embodiment)
281 Diffuser tube
290 Mercury removal system (eleventh embodiment)
300 Mercury removal system (twelfth embodiment)
310 Mercury removal system (thirteenth embodiment)
320 Mercury removal system (fourteenth embodiment)
321 Flow rate adjustment valve
322 Mercury system
323 Control unit
350 Mercury removal system (fifteenth embodiment)
351 Supply nozzle
360 Mercury removal system (sixteenth embodiment)
370 Mercury removal system (seventeenth embodiment)
371 Curved portion
380 Mercury removal system (eighteenth embodiment)
381 Diffuser tube
L1 Raw coal supply line (hydrocarbon raw material supply line)
L2 Dry gas supply line
L3 Pulverized coal supply line (powder raw material supply line)
L4 Gas discharge line
L5 Gas generation line
L12 Powder supply line (mercury removal agent supply line)
L13 Powder discharge line
L14 Pure gas discharge line
L15 First recirculation line
L16 Second recirculation line
L17 Char supply line

The invention claimed is:

1. A mercury removal system provided in a powder supply system including a pulverizing machine that pulverizes a hydrocarbon raw material along with a dry gas supplied from the outside so as to become a powder raw material, the mercury removal system comprising:
a removal agent supply device which supplies a mercury removal agent for removing mercury contained in a dry flue gas discharged from the pulverizing machine; and
a mercury removal agent dust collector which collects the dust of the mercury removal agent so as to be separated into the mercury removal agent and a pure gas,
wherein a gas discharge line to which the dry flue gas is supplied is connected to the mercury removal agent dust collector,
wherein the removal agent supply device includes a mercury removal agent supply line which supplies the mercury removal agent, and
wherein the mercury removal agent supply line is connected to the upstream side of the mercury removal agent dust collector in the circulation direction of the dry flue gas.

2. The mercury removal system according to claim 1,
wherein the powder supply system includes the pulverizing machine, a powder dust collector which collects the dust of the powder raw material discharged from the pulverizing machine so as to be separated into the dry flue gas and the powder raw material, and a powder raw material supply line which supplies the powder raw material from the pulverizing machine to the powder dust collector, and
wherein the mercury removal agent supply line is connected to the upstream side of the powder dust collector in the circulation direction of the powder raw material.

3. The mercury removal system according to claim 2,
wherein the mercury removal agent supply line is connected to the powder raw material supply line.

4. The mercury removal system according to claim 2,
wherein the mercury removal agent supply line is connected to the pulverizing machine.

5. The mercury removal system according to claim 2,
wherein a hydrocarbon raw material supply line which supplies the hydrocarbon raw material is connected to the pulverizing machine, and
wherein the mercury removal agent supply line is connected to the hydrocarbon raw material supply line.

6. The mercury removal system according to claim 2,
wherein a dry gas supply line through which the dry gas is supplied from the outside is connected to the pulverizing machine, and
wherein the mercury removal agent supply line is connected to the dry gas supply line.

7. The mercury removal system according to claim 3,
wherein the removal agent supply device further includes a plurality of supply nozzles which are provided in the powder raw material supply line and supply the mercury removal agent from the mercury removal agent supply line into the powder raw material supply line.

8. The mercury removal system according to claim 7,
wherein the powder raw material supply line includes at least one curved portion, and
wherein at least one supply nozzle of the plurality of supply nozzles is provided in the vicinity of an upstream entrance of the curved portion in the circulation direction of the powder raw material and the dry flue gas.

9. The mercury removal system according to claim 7,
wherein the plurality of supply nozzles are provided along a tube wall in a tube cross-section perpendicular to the circulation direction of the powder raw material and the dry flue gas.

10. The mercury removal system according to claim 7,
wherein the plurality of supply nozzles are provided at a predetermined interval in the circulation direction of the powder raw material and the dry flue gas.

11. The mercury removal system according to claim 9,
wherein the powder raw material supply line is formed as a cylindrical tube, and
wherein each of the plurality of supply nozzles is disposed in the range of "$0 \leq r \leq 2/3R$" when the radius of the powder raw material supply line in a predetermined radial direction in a plane perpendicular to the tube axis direction of the powder raw material supply line is indicated by R and the distance between the center of the cylindrical tube and an extension line of the axis direction of each supply nozzle of the plurality of supply nozzles is indicated by r.

12. The mercury removal system according to claim 2, further comprising:
  at least one supply nozzle which is provided in the powder raw material supply line and supplies the mercury removal agent from the mercury removal agent supply line into the powder raw material supply line; and
  a solid-gas separator which separates the powder raw material and the dry flue gas,
  wherein the solid-gas separator is disposed between the pulverizing machine and the powder dust collector,
  wherein the powder raw material supply line includes a first powder raw material supply line which connects the pulverizing machine to the solid-gas separator and a second powder raw material supply line which connects the solid-gas separator to the powder dust collector, and
  wherein at least one of the first and second powder raw material supply lines is provided with the supply nozzles.

13. The mercury removal system according to claim 2,
  wherein the powder dust collector is a bag filter which includes a storage portion storing the mercury removal agent and the powder raw material subjected to the dust collection process, and
  wherein the removal agent supply device supplies the mercury removal agent to the storage portion of the bag filter.

14. The mercury removal system according to claim 1,
  wherein the powder supply system includes the pulverizing machine and a powder dust collector which collects the dust of the powder raw material discharged from the pulverizing machine so as to be separated into the dry flue gas and the powder raw material,
  wherein the gas discharge line is connected to the powder dust collector, and
  wherein the mercury removal agent supply line is connected to the gas discharge line.

15. The mercury removal system according to claim 14, further comprising:
  a first recirculation line which recirculates the mercury removal agent from which the dust is collected by the mercury removal agent dust collector,
  wherein the first recirculation line is connected to the gas discharge line.

16. The mercury removal system according to claim 15,
  wherein the first recirculation line is connected to the upstream portion of the connection portion between the mercury removal agent supply line and the gas discharge line in the circulation direction of the dry flue gas.

17. The mercury removal system according to claim 14, further comprising:
  a second recirculation line which recirculates the mercury removal agent from which the dust is collected by the mercury removal agent dust collector,
  wherein the powder supply system includes a powder raw material supply line which supplies the powder raw material from the pulverizing machine to the powder dust collector, and
  wherein the second recirculation line is connected to the powder raw material supply line.

18. The mercury removal system according to claim 14, further comprising:
  a mercury system which measures the amount of the mercury remaining in the pure gas; and
  a control unit which controls the mercury removal agent supply amount based on the measurement result of the mercury system, and
  wherein the mercury system is provided at the downstream side of the mercury removal agent dust collector.

19. The mercury removal system according to claim 14,
  wherein the removal agent supply device further includes a plurality of supply nozzles which are provided in the gas discharge line and supply the mercury removal agent from the mercury removal agent supply line into the gas discharge line.

20. The mercury removal system according to claim 19,
  wherein the gas discharge line includes at least one curved portion, and
  wherein at least one supply nozzle of the plurality of supply nozzles is provided in the vicinity of an upstream entrance of the curved portion in the circulation direction of the dry flue gas.

21. The mercury removal system according to claim 19,
  wherein the plurality of supply nozzles are provided along a tube wall in a tube cross-section perpendicular to the circulation direction of the dry flue gas.

22. The mercury removal system according to claim 19,
  wherein the plurality of supply nozzles are provided at a predetermined interval in the circulation direction of the dry flue gas.

23. The mercury removal system according to claim 21,
  wherein the gas discharge line is formed as a cylindrical tube, and
  wherein each of the plurality of supply nozzles is disposed in the range of "$0 \leq r \leq 2/3R$" when the radius of the gas discharge line in a predetermined radial direction in a plane perpendicular to the tube axis direction of the gas discharge line is indicated by R and the distance between the center of the cylindrical tube and an extension line of the axis direction of each supply nozzle of the plurality of supply nozzles is indicated by r.

24. The mercury removal system according to claim 14,
  wherein the powder dust collector is a bag filter which includes a storage portion storing the mercury removal agent and the powder raw material from which the dust is collected, and
  wherein the removal agent supply device supplies the mercury removal agent to the storage portion of the bag filter.

25. A gasification system comprising:
  the mercury removal system according to claim 1;
  a powder supply system which includes a pulverizing machine pulverizing a hydrocarbon raw material along with a dry gas supplied from the outside so as to become a powder raw material; and
  a gasification furnace which gasifies the powder raw material separated by the mercury removal system.

26. The gasification system according to claim 25, further comprising:
  a char recovery device which collects char as an unreacted element of the powder raw material generated by the production of a gasified gas,
  wherein the removal agent supply device further includes a storage tank which stores the mercury removal agent, and
  wherein the char recovery device is connected to the storage tank.

27. A gasification combined power generation system comprising:

the mercury removal system according to claim 1;

a powder supply system which includes a pulverizing machine pulverizing a hydrocarbon raw material along with a dry gas supplied from the outside so as to become a powder raw material;

a gasification furnace which gasifies the powder raw material separated by the mercury removal system;

a gas turbine which is operated by using a gasified gas gasified in the gasification furnace as a fuel;

a steam turbine which is operated by vapor generated by an exhaust heat recovery boiler introducing a combustion flue gas from the gas turbine; and a generator which is connected to the gas turbine and the steam turbine.

28. A mercury removal method comprising:

a dry gas is supplied, pulverizing a hydrocarbon raw material so as to generate a powder raw material and a dry flue gas;

collecting the dust of the powder raw material;

supplying a mercury removal agent to the dry flue gas;

mixing the dry flue gas with the mercury removal agent; and collecting the dust of the mercury removal agent.

* * * * *